United States Patent [19]
Nishi et al.

[11] Patent Number: 4,561,260
[45] Date of Patent: Dec. 31, 1985

[54] METHOD OF CONTROLLING REFRIGERATION SYSTEM FOR AUTOMOTIVE AIR CONDITIONER

[75] Inventors: Yasuyuki Nishi, Oobu; Masashi Takagi, Kariya; Masao Sakurai, Oobu, all of Japan

[73] Assignee: Nippondenso Co., Ltd., Kariya, Japan

[21] Appl. No.: 621,235

[22] Filed: Aug. 6, 1984

Related U.S. Application Data

[62] Division of Ser. No. 416,065, Sep. 8, 1982, Pat. No. 4,471,632.

[30] Foreign Application Priority Data

| Sep. 9, 1981 | [JP] | Japan | 56-142005 |
| Oct. 5, 1981 | [JP] | Japan | 56-158364 |
| Oct. 14, 1981 | [JP] | Japan | 56-163846 |
| Dec. 7, 1981 | [JP] | Japan | 56-196649 |

[51] Int. Cl.⁴ ................................. F25B 1/00
[52] U.S. Cl. ........................ 62/115; 62/133; 62/228.5; 62/229
[58] Field of Search ............ 62/228.4, 228.5, 208, 62/209, 175, 229, 133, 115; 236/1 EA, 91 D; 165/28

[56] References Cited

U.S. PATENT DOCUMENTS

3,499,297  3/1970  Ruff et al. ............... 62/228.4 X
4,326,386  4/1982  Tamura ....................... 62/209

*Primary Examiner*—William E. Wayner
*Attorney, Agent, or Firm*—Cushman, Darby & Cushman

[57] ABSTRACT

A refrigeration system for an automotive air conditioner includes an evaporator and a variable displacement refrigerant compressor adapted to be driven by an automotive engine. In order to control the refrigeration system, detectors are provided to detect a condition related to the cooling operation of the evaporator, such as air temperature just downstream of the evaporator or the refrigerant pressure, and to detect air temperature in the occupant compartment of the automobile, ambient air temperature outside the automobile or intake air temperature upstream of the evaporator. Signals emitted by the detectors are utilized to control the compressor operation such that the displacement capacity of the compressor is varied stepwise and the compressor is operated intermittently whereby the load on the engine is reduced and the frosting of the evaporator is prevented.

5 Claims, 32 Drawing Figures

METHOD OF CONTROLLING REFRIGERATION SYSTEM FOR AUTOMOTIVE AIR CONDITIONER

CROSS-REFERENCE TO RELATED APPLICATIONS

This is a division of application Ser. No. 416,065, filed Sep. 8, 1982, now issued as U.S. Pat. No. 4,471,632. Also, this application is generally related to our copending earlier U.S. patent applications Ser. No. 359,985 filed Mar. 19, 1982, No. 372,380 filed Apr. 27, 1982 and issued as U.S. Pat. No. 4,480,443, and U.S. Pat. No. 398,882 filed Jul. 6, 1982 and now issued as U.S. Pat. No. 4,476,692.

BACKGROUND OF THE INVENTION

The present invention relates to a method of controlling a refrigeration system suited for use in, but not exclusively, an automotive air conditioning system and, more particularly, to a capacity control of such a refrigeration system.

DESCRIPTION OF THE PRIOR ART

Figure 1:
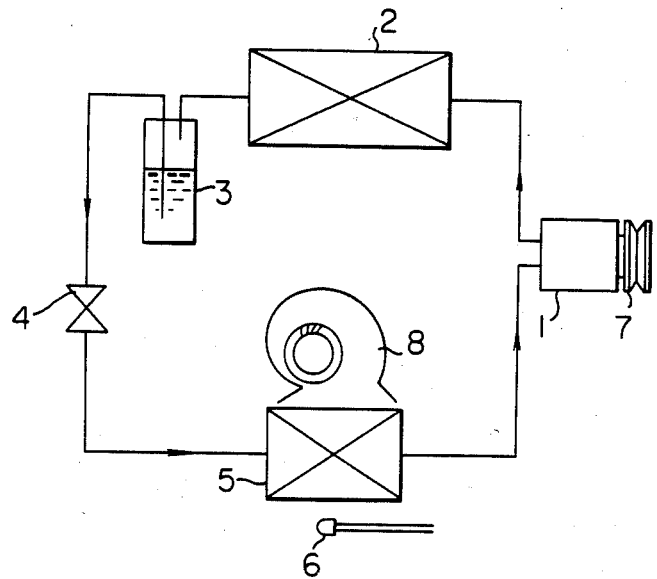
FIG. 1 is a block diagram of the refrigeration cycle of the prior art automotive air conditioner.

As will be seen from FIG. 1, a typical conventional automotive air conditioning system employs a vapor compression type referigeration cycle consisting essentially of a compressor 1, a condenser 2, a receiver 3, an expansion valve 4 and an evaporator 5. Since the compressor 1 is driven by the automobile engine (not shown) through an electromagnetic clutch 7, the operation speed of the compressor is naturally increased as the engine speed becomes higher. In this conventional air conditioning system, it is often experienced that a frosting or icing takes place on the fins of the evaporator as the surface temperature of the evaporator fins and thus the evaporation temperature of the refrigerant comes down below 0° C. due either to the increase in the operation speed of the compressor or to the reduction in the ambient air temperature. The frosting or icing on the fins reduces the rate of the air flow from a blower 8 through the evaporator 5, resulting in a reduction in the air cooling capacity.

Figure 2:
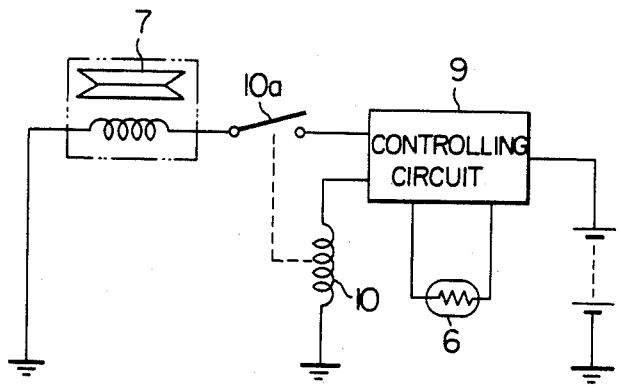
FIG. 2 is an electrical block diagram illustrating a capacity control system of the prior art refrigeration cycle shown in FIG. 1.

In order to prevent the frosting or icing on the evaporator fins or to control the air temperature in the automobile, therefore, the temperature of air just downstream of the evaporator 5 is detected by a temperature detector 6 such as a thermistor which is electrically connected to a controlling circuit 9 shown in FIG. 2 so that a relay 10 is controlled in accordance with the output from the temperature detector to open and close a relay contact 10a to engage or disengage the electromagnetic clutch 7, whereby the period of operation of the compressor is controlled to adjust the evaporation temperature of the refrigerant thereby to control the air temperature immediately downstream of the evaporator.

Figure 3:
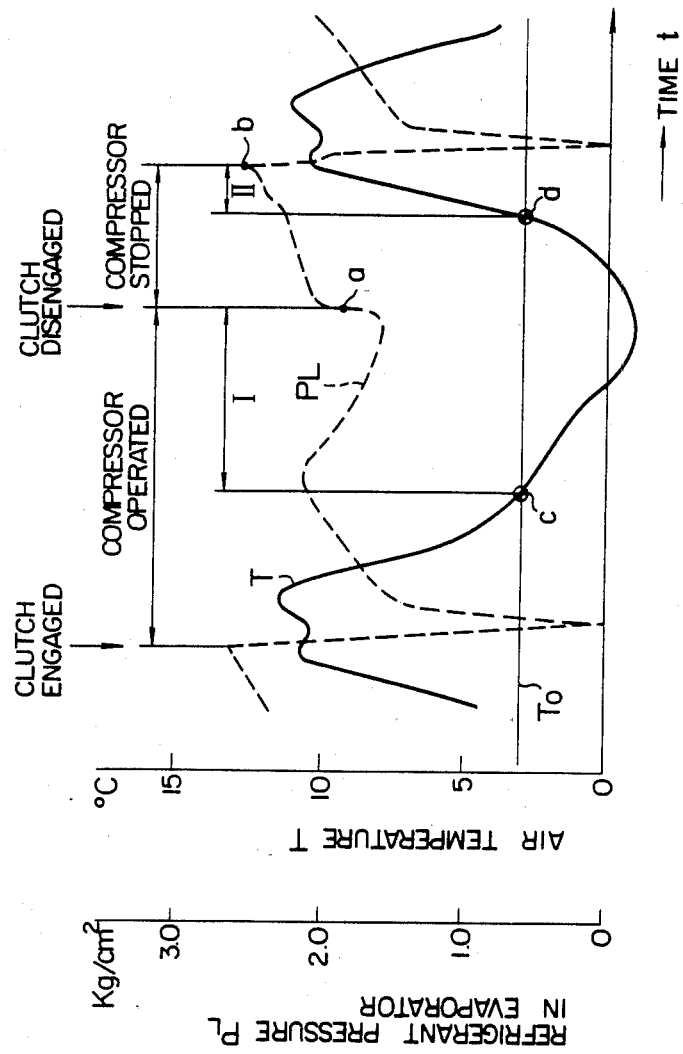
FIG. 3 graphically illustrates variations in the refrigerant pressure in evaporator and in the air temperature immediately downstream of the evaporator, as obtained by the prior art capacity control system.

This arrangement, however, has the following drawback. Namely, when the cooling load is decreased or the operation speed of the compressor 1 is increased, the displacement of the compressor 1 and thus of the refrigeration cycle exceeds the cooling load or demand. In such a case, the air temperature T just downstream of the evaporator 5 is lowered and comes down below a set temperature To at a point (c), as shown in FIG. 3. However, a considerably long time period represented by I in FIG. 3 is required until the controlling circuit 9 is put into effect due to a large heat capacity of the temperature detector 6. In consequence, the air temperature T is further lowered for the time period I until a moment (a) at which the controlling circuit 9 starts to operate is reached. Thus, the air temperature is lowered to a level considerably lower than the set temperature To. The controlling circuit 9 starts to operate at the moment (a) to disengage the clutch 7 so that the compressor 1 stops. Then the expansion valve 4 is closed to stop the supply of the refrigerant to the evaporator 5. In consequence, the internal pressure $P_L$ in the evaporator 5 is raised to increase the area of super heating of the refrigerant with a resultant decrease in the effective heat transfer area of the evaporator 5. As a result, the air temperature T just downstream of the evaporator 5 is increased drastically and comes to exceed the set temperature at a moment (d). The rise of the air temperature T, however, is continued undesirably to a moment (b) at which the controlling circuit 9 starts operation, due to the presence of a time period II attributable to the heat capacity of the temperature detector 6. The operation of the controlling circuit 9 is started at the moment (b) to again engage the clutch 7 thereby to start the compressor 1 again. The above-described operation is repeated to control the air temperature T.

In the prior art automotive air conditioning system, the compressor is intermittently operated at its full or maximum capacity irrespective of whether the demand for the cooling capacity is small or large. Thus, when the compressor is operated, a large load is applied on the engine continuously. This is disadvantageous in the view points of power consumption and operation noise.

SUMMARY OF THE INVENTION

It is a primary object of the present invention to provide a method of controlling a refrigeration system for an automotive air conditioning system which can eliminate the prior art problem and in which the displacement of the refrigerant compressor is varied to match with variable demand to reduce the power consumption and decrease the operation noise.

It is another object of the present invention to provide a method of controlling a refrigeration system for an automotive air conditioning system which can assure that the frosting of the evaporator is reliably prevented.

It is a further object of the present invention to provide a refrigeration system controlling method specified above and which can provide a comfortable air conditioning in the occupant compartment of the automobile.

According to one feature of the present invention, there is provided a method of controlling a refrigeration system for an automotive air conditioner, the refrigeration system including a variable capacity refrigerant compressor and an evaporator, the method including; detecting a condition related to the cooling operation of the automobile, and controlling the compressor operation in accordance with the results of the detections such that the displacement capacity of the compressor is varied stepwise and the compressor is operated intermittently.

According to another feature of the invention, there is provided a method of controlling a refrigeration system for an automotive air conditioner, the refrigeration system including a variable capacity refrigerant compressor and an evaporator, the method including; detecting a condition related to the cooling operation of the evaporator, detecting the temperature of the ambient air outside the occupant compartment of the automobile, and controlling the operation of the compressor in accordance with the results of the detections such that the displacement capacity of the compressor is varied stepwise and the compressor is operated intermittently.

According to a further feature of the present invention, there is provided a method of controlling a refrigeration system for an automotive air conditioner, the system including a variable capacity refrigerant compressor adapted to be driven by an automotive engine and an evaporator, the method including; detecting a condition related to the cooling operation of the compressor, detecting the temperature of the ambient air outside the occupant compartment of the automobile, detecting the operation speed of the engine, and controlling the operation of the compressor in accordance with the results of the detections such that the displacement capacity of the compressor is varied stepwise and the compressor is operated intermittently.

The above objects, features and advantages of the present invention will be made more apparent by the following description with reference to FIGS. 4 to 24.

DESCRIPTION OF PREFERRED EMBODIMENTS

The refrigeration system embodying the present invention basically employs a refrigeration cycle identical to the prior art refrigeration cycle discussed with reference to FIG. 1. Thus, the parts of the respective embodiments of the invention similar to those of the prior art refrigeration cycle are designated by the same reference numerals. Description of the refrigeration cycle itself is omitted accordingly.

Figure 4:
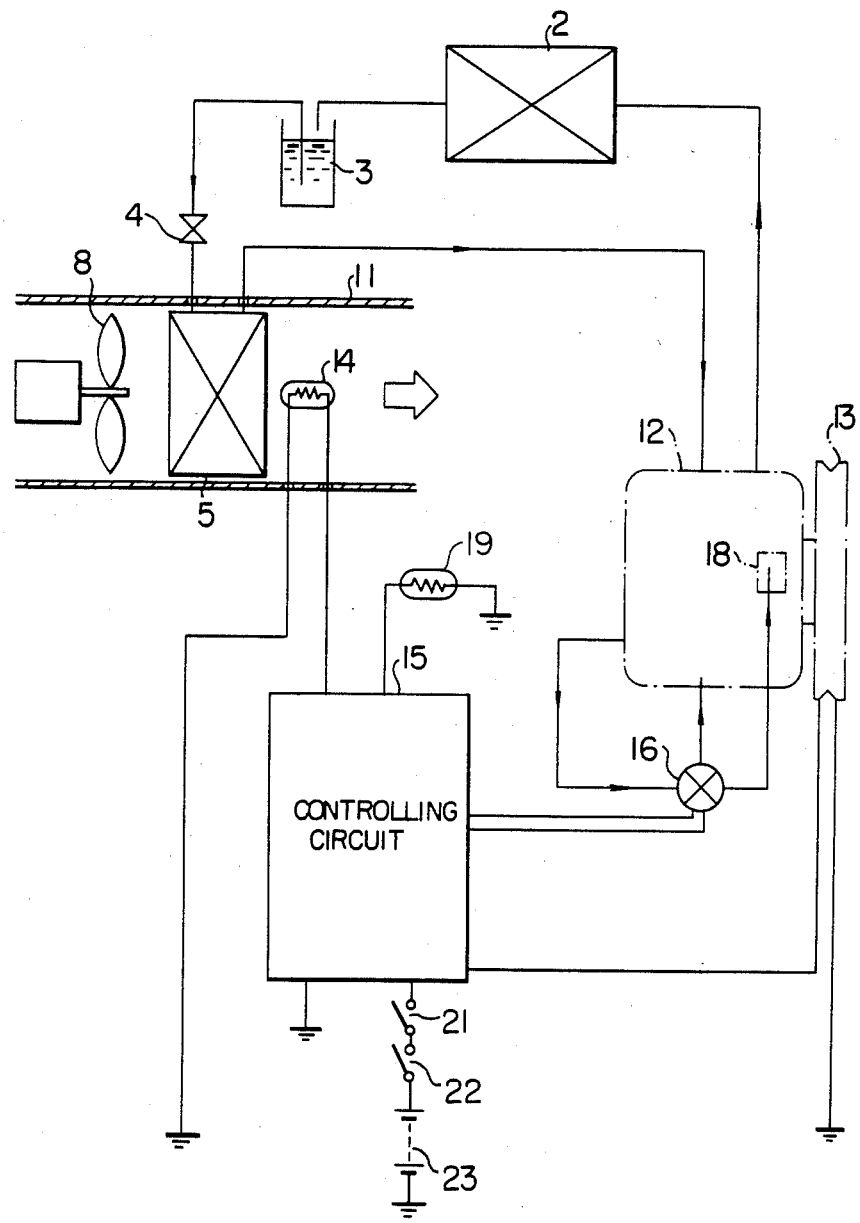
FIG. 4 is a diagrammatic illustration of an embodiment of the refrigeration system according to the present invention.

FIG. 4 shows the whole part of a first embodiment of the refrigeration system of the invention. The refrigeration system has an evaporator 5 and a motor-driven blower 8 disposed in a plastic duct 11 of an automotive air conditioner. The duct is communicated at its left-hand end with an ambient air intake opening and an internal air intake opening through a communication-switching box which is not shown. The duct is also communicated at its right-hand end with air outlets open to the passenger or occupant compartment, such as upper air outlets for cooled air and lower air outlets for warmed air. A heater unit, not shown, is disposed in the duct 11. A compressor 12 is connected at its suction or intake side to the outlet end of a refrigerant pipe extending from the discharge port of the evaporator 5. The compressor 12 is adapted to be driven by the engine of the automobile through an electromagnetic clutch 13. As will be described later, this compressor 12 is of a variable capacity or discharge type including displacement varying means 18 for varying the capacity or displacement of the compressor. A temperature detector 14 consisting of a thermistor is adapted to detect the air temperature immediately downstream of the evaporator 5.

A second temperature detector 19 consisting of a second thermistor is provided to detect the air temperature within the passenger or occupant compartment of the automobile. The output signals of the temperature detectors 14 and 19 are delivered to a controlling circuit 15 adapted to control a solenoid-operated pilot valve 16 for actuating or controlling the compressor displacement varying means 18. The operation of the air conditioner can be manually controlled by an air-conditioner switch 21 which is provided in series with an engine ignition switch 22 which in turn is provided in series with batteries 23 mounted on an associated automobile.

Figure 5:
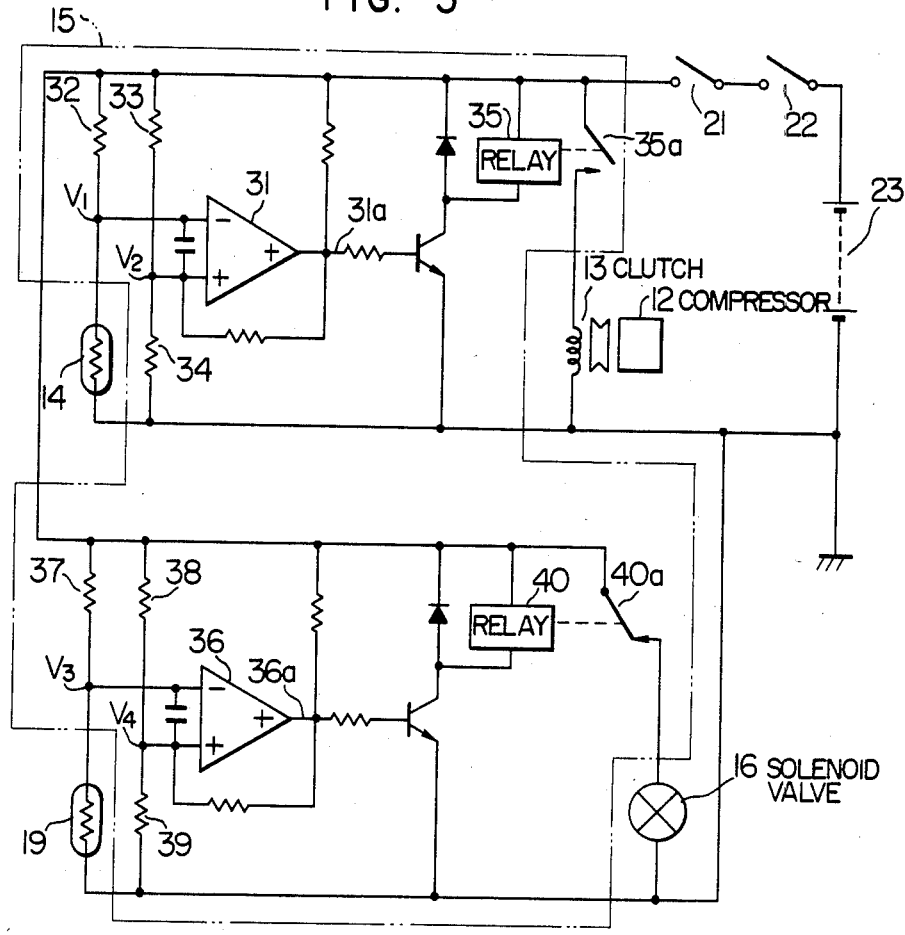
FIG. 5 shows an electric circuitry of the controlling circuit of the system shown in FIG. 4.

Referring now to FIG. 5, a practical example of the controlling circuit 15 includes comparators 31 and 36. The comparator 31 is operative to produce an electrical output 31a which is determined by an electric potential V1 and a reference potential V2. The potential V1 is dependent on the resistance of a resistor 32 and the resistance R14 of the thermistor of the temperature detector 14 while the potential V2 is dependent on the resistances of resistors 33 and 34. The comparator output 31a is utilized to control a relay 35 which is operative to selective electrically energize and deenergize the electromagnetic clutch 13 associated with the refrigerant compressor 12.

The comparator 36 is operative to produce an electric output 36a which is determined by an electric potential V3 and a reference potential V4. The potential V3 is dependent on the resistance of a resistor 37 and the resistance R19 of the thermistor of the second temperature detector 19 while the reference potential V4 is dependent on the resistances of resistors 38 and 39. The comparator output 36a is utilized to control a second relay 40 which is operative to selectively electrically energize and deenergize the solenoid operated valve 16.

Figure 6A:
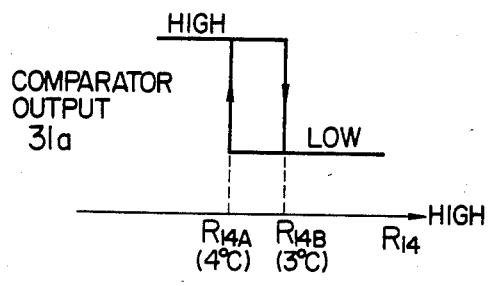
FIGS. 6A and 6B illustrate the operation characteristics of the comparators of the electric circuitry shown in FIG. 5.
Figure 6B:
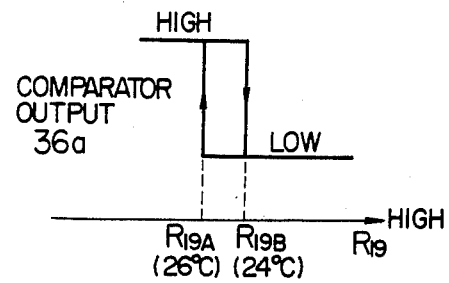

The thermistors of the temperature detectors 14 and 19 are both of negative characteristics, so that the resistances of these thermistors are decreased or lowered as the air temperatures rise. FIGS. 6A and 6B diagrammatically illustrate the relationships between the changes of the thermistor resistances R14 and R19 and the changes of the comparator outputs 31a and 36a, respectively.

As will be seen in FIG. 6A, the comparator output 31a will become "HIGH" level when the air temperature just downstream of the evaporator rises beyond 4° C. and the thermistor resistance R14 is lowered to a level less than R14A. On the other hand, the comparator output 31a will become "LOW" level when the air temperature just downstream of the evaporator is lowered beyond 3° C. and the thermistor resistance R14 is increased to a level higher than R14B.

As will be seen in FIG. 6B, the comparator output 36a will become "HIGH" level when the air temperature in the occupant compartment of the automobile rises beyond a predetermined set temperature, for example 26° C., and the thermistor resistance R10 is lowered beyond R19A. On the other hand, the comparator output 36a will become "LOW" level when the occupant compartment temperature is lowered beyond a predetermined set temperature level, for example 24° C., and the thermistor resistance R19 is increased to a level higher than R19B.

Figure 7:
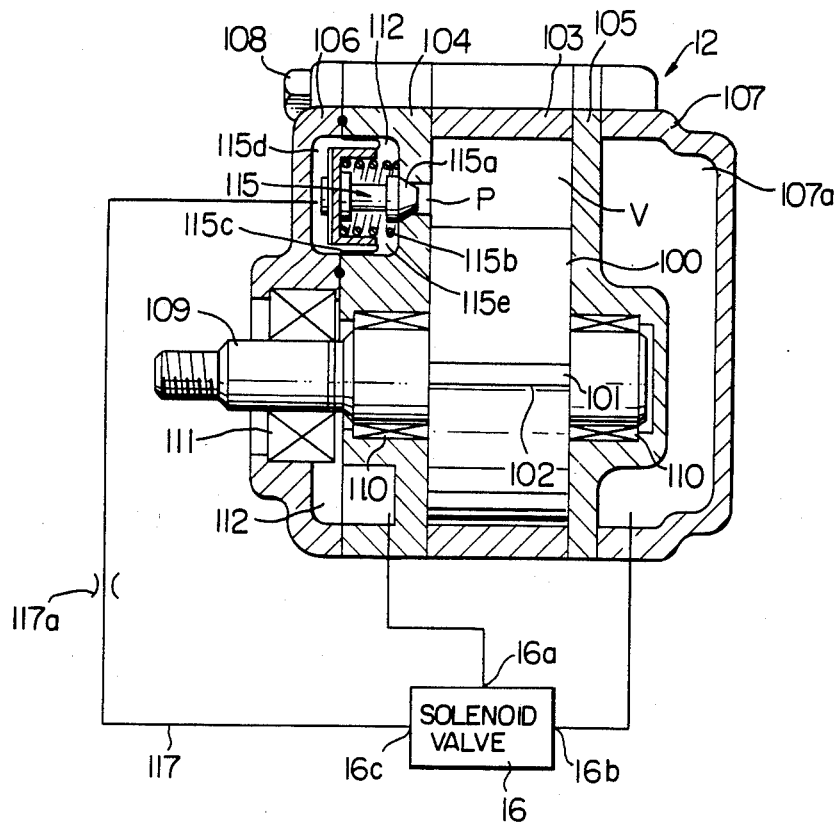
FIG. 7 is an axial sectional view of the compressor shown in FIG. 4.
Figure 8:
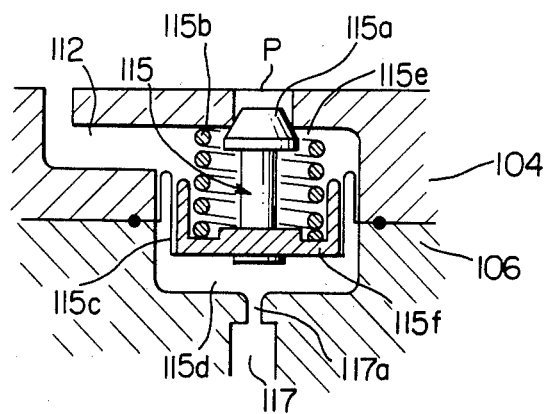
FIG. 8 is a fragmentary sectional view of the compressor showing an unloading port and a valve for opening and closing the same.
Figure 9A:
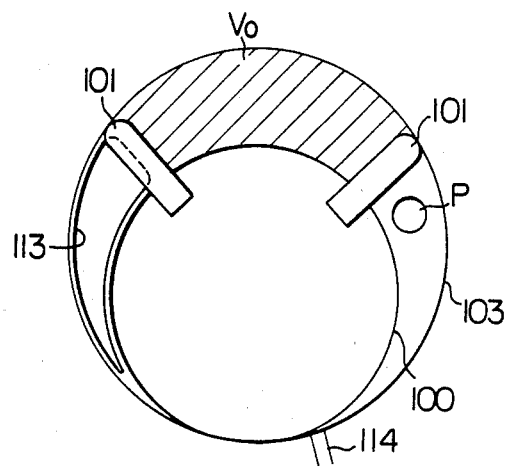
FIGS. 9A and 9B are diagrammatic cross-sectional views of the compressor diagrammatically illustrating the displacement control of the compressor.
Figure 9B:
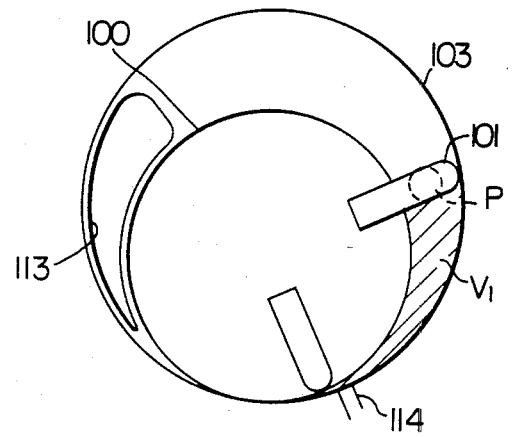

Referring now to FIGS. 7-9, the compressor 12 includes a cylindrical rotor 100 carrying a plurality of vanes 101 mounted for radial sliding movement in radial grooves 102 formed in the outer peripheral surface of the rotor. Two vanes 101 only are shown in FIGS. 9A and 9B but it can be appreciated by those in the art that in fact the rotor 100 carries four vanes arranged at equal angular intervals. The rotor 100 is disposed eccentrically in a cylinder 103 having an inner peripheral surface which limits the radial outer movements of respective vanes 101 and with which the vanes are in slidable contact at their outer ends. Front and rear end plates 104 and 105 are secured to the opposite ends of the cylinder 103. The rotor 100 and the vanes 101 are axially dimensioned such that their opposite axial ends are spaced from the end plates 104 and 105 so that very small gaps are defined therebetween.

The rotor 100, vanes 101, cylinder 103 and front and rear end plates 104 and 105 cooperate together to define variable working spaces V the volumes of which are varied as the rotor 100 is rotated with the vanes 101. The cylinder 103, front and rear end plates 104 and 105 and a pair of housing members 106 and 107 are secured together by bolts 108 to form a unitary structure. The rotor 100 is rigidly mounted on a shaft 109 which in turn is rotatably mounted on the front and rear end plates 104 and 105 by means of bearings 110 and adapted to be driven by the engine through torque transmission means inlcuding the electromagnetic clutch 13 referred to above. A seal 111 is provided between the shaft 109 and the housing member 106.

The front end plate 104 and the housing member 106 cooperate to define therebetween an intake chamber 112 connected to the evaporator 5 to receive the refrigerant therefrom. The front end plate 104 defines therein an intake port 113 (see FIGS. 9A and 9B) through which the intake chamber 112 is adapted to be communicated with successive working spaces V so that the refrigerant is sucked from the intake chamber 112 into successive working spaces V. FIG. 9A illustrates one working space V as being charged with the refrigerant at an intake pressure. The refrigerant in the working space V is gradually compressed as the volume of the working space V is decreased. When the working space V is brought to a maximum compression position, the compressed refrigerant is discharged from the working space V through a discharge port 114 in the cylinder 103 and through a discharge valve (not shown) into a discharge chamber 107a defined between the housing member 107 and the rear end plate 105. The discharged refrigerant is then recirculated from the discharge chamber 107a to the condenser 2 of the refrigeration cycle.

The front end plate 104 is formed therein with an unloading port P to communicate the intake chamber 112 with working spaces V. A valve 115 is provided to close and open the unloading port P.

When the unloading port P is opened by the valve 115, the working space V which is communication with the unloading port P is not capable of performing its compression operation until after this working space is moved out of communication with the port P. Thus, this working space commences its compression operation form a volume V1, as shown in FIG. 9B. It will be seen from the comparison between FIGS. 9A and 9B that the initial or compression-starting volume V1 in the case of the unloading port P being opened by the valve 115 is much smaller than the initial or compression-starting volume Vo in the case of the port P being closed by the valve 115. In the illustrated embodiment of the invention, the unloading port P is positioned such that the volume V1 is approximately from 30 to 50% of the volume Vo.

Referring to FIG. 8, the valve 115 has a valve member 115a movable into and out of sealing engagement with the peripheral edge of the unloading port P, a spring 115b resiliently biasing the valve member 115a in a valve-opening direction, a bellow-phragm 115c adapted to actuate the valve member 115a to the valve-closed position and a cup-shaped member 115f acting as a spring retainer and guide for the bellow-phragm. The valve member 115a is made of a material having a high mechanical strength, such as a stainless steel. The outer surfaces of the cup-shaped member 115f and the bellow-phragm 115c cooperate with the housing member 106 of the compressor to define a pilot pressure chamber 115d which is connected by a pilot pressure passage 117 to the solenoid-operated pilot valve 16 to be described later. The passage 117 is provided therein with a restriction 117a which is operative to prevent the pilot pressure chamber 115d from being subjected to sudden increase in the pilot pressure applied thereto. The inner surfaces of the cup-shaped members 115f and the bellow-phragm 115c cooperate with the front end plate 104 to define a chamber 115e communicated with the intake chamber 112 of the compressor 12.

The unloading port P and the valve 115 cooperate to constitute the compressor displacement varying means 18 referred to previously.

The pilot valve 16 is operative to control the actuator for the valve 115 associated with the unloading port P1.

Figure 10:
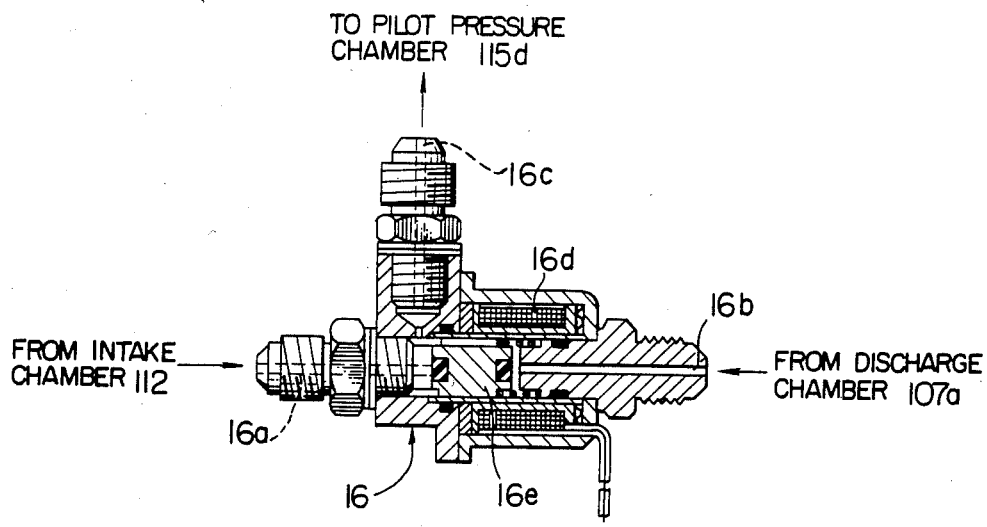
FIG. 10 is an enlarged partly sectional view of a solenoid operated pilot valve for controlling the valve for opening and closing the unloading port shown in FIGS. 7, 8, 9A and 9B.

The structural details of the pilot valve 16 are shown in FIG. 10. The valve 16 includes a compressor intake pressure inlet port 16a pneumatically connected to the compressor intake chamber 112, a compressor discharge pressure inlet port 16b pneumatically connected to the compressor discharge chamber 107a and a pilot pressure outlet port 16c penumatically connected to the pilot pressure chamber 115d in the compressor, as shown in FIG. 8. The pneumatic connections between the pilot valve 16 to the compressor 12 are shown in FIG. 7. The pilot valve 16 further includes a coil 16d adapted to be electrically energized and deenergized to electromagnetically actuate a valve member 16e of a magnetic material so that the position of the valve member 16e with respect to the pressure inlet ports 16a and 16b is selectively changed to communicate the pilot pressure outlet port 16c either with the compressor intake chamber 112 through the pressure inlet port 16a or with the compressor discharge chamber 107a through the pressure inlet port 16b.

When the pilot pressure outlet port 16c is communicated with the compressor intake chamber 112, the pilot pressure chamber 115d is at the compressor intake pressure, so that the spring 115b moves the valve member 115a away from the unloading port P to allow working spaces V to be communicated with the compressor intake chamber 112. On the other hand, when the pilot pressure outlet port 16c of the pilot valve is communicated with the compressor discharge chamber 107a, the compressor discharge pressure is introduced into the pilot pressure chamber 115d so that the valve member 115a is moved against the spring 115b into sealing engagement with the peripheral edge of the unloading port P to interrupt the communication between the compressor intake chamber 112 and the working spaces V.

In order to prevent the solenoid-operated pilot valve 16 from being overheated, the valve is disposed on or adjacent to the part of the compressor 12 which is kept at a relatively low temperature level, such as a service valve (not shown) or the front housing member 106.

The operation of the system described above will now be discussed hereunder. Assuming that the occupant compartment temperature is higher than 26° C. and the resistance R19 of the thermistor of the temperature detector 19 is less than the level R19A, the comparator output 36a is at the "HIGH" level, so that a normally closed contact 40a of the relay 40 is opened to electrically deenergize the solenoid operated pilot valve 16. At this time, the valve 16 takes the position shown in FIG. 10 in which the valve member 16e allows the compressor discharge pressure inlet port 16b to be communicated with the pressure outlet port 16c so that the compressor discharge pressure is fed through the pressure inlet port 16b and the pressure outlet port 16c into the pilot pressure chamber 115d. Thus, the unloading port P is closed by the valve 115 so that the compressor 12 is adjusted to be operated at its maximum capacity or displacement.

Under the condition described above, if the air temperature just downstream of the evaporator is higher than 4° C., the resistance R14 of the thermistor of the temperature detector 14 is reduced to a level less than R14A and the comparator output 31a becomes "HIGH" level. Thus, a normally open contact 35a of the relay 35 is closed so that the electromagnetic clutch 13 is engaged. The comperssor 12, therefore, is operated at its maximum capacity or displacement.

When the air temperature just downstream of the evaporator is lowered beyond 3° C., the thermistor resistance R14 is increased beyond R14B and the comparator output 31a becomes "LOW" level. At this time, the contact 35a of the relay 35 is opened to disengage the cluth 13 so that the operation of the compressor 12 is interrupted to prevent frosting of the evaporator 5.

When the occupant compartment temperature is lowered to a level less than 24° C., the resistance R19 of the thermistor of the temperature detector 19 is increased beyond R19B and the comparator output 36a becomes "LOW" level. Thus, the normally closed contact 40a of the relay 40 is closed to electrically energize the solenoid operated pilot valve 16. Thus, the valve member 16e is actuated by the coil 16d to a position in which the compressor discharge pressure inlet port 16b is blocked and the compressor intake pressure inlet port 16a is communicated with the pressure outlet port 16c. Accordingly, the valve member 115a of the valve 115 associated with the unloading port P is moved by the spring 115b away from the port P whereby the compressor 12 is adjusted to be operated at its reduced or small displacement capacity.

Under the condition described, if the air temperature just downstream of the evaporator is higher than 4° C., the resistance R14 of the thermistor of the temperature detector 14 is reduced to a level less than R14A and the comparator output 31a becomes "HIGH" level. Thus, the normally open relay contact 35a is closed to engage the cluth 13 whereby the compressor operation is restarted with the displacement capacity thereof kept reduced or small.

When the air temperature just downstream of the evaporator is lowered beyond 3° C., the thermistor resistance R14 is increased to a level higher than R14B and the comparator output 31a becomes "LOW" level. The normally open relay contact 35a is opened to disengage the cluth 13 so that the compressor operation is interrupted to prevent the frosting of the evaporator 5.

As such, the control system described above is operative to control the compressor operation such that, when the occupant compartment is at a high temperature and calls for a high cooling capacity, the compressor 12 is operated at its maximum displacement capacity and intermittently to prevent the frosting of the evaporator 5 and such that, when the occupant compartment is at a relatively low temperature and calls for a reduced or lowered cooling capacity, the compressor 12 is operated at its reduced displacement capacity and intermittently to prevent the frosting of the evaporator.

Indicentally, the maximum capacity and intermittent mode of the compressor operation in the case of the high occupant compartment temperature may alternatively be changed to another mode of operation in which the maximum capacity operation and the reduced capacity operation are repeatedly switched.

Figure 11:
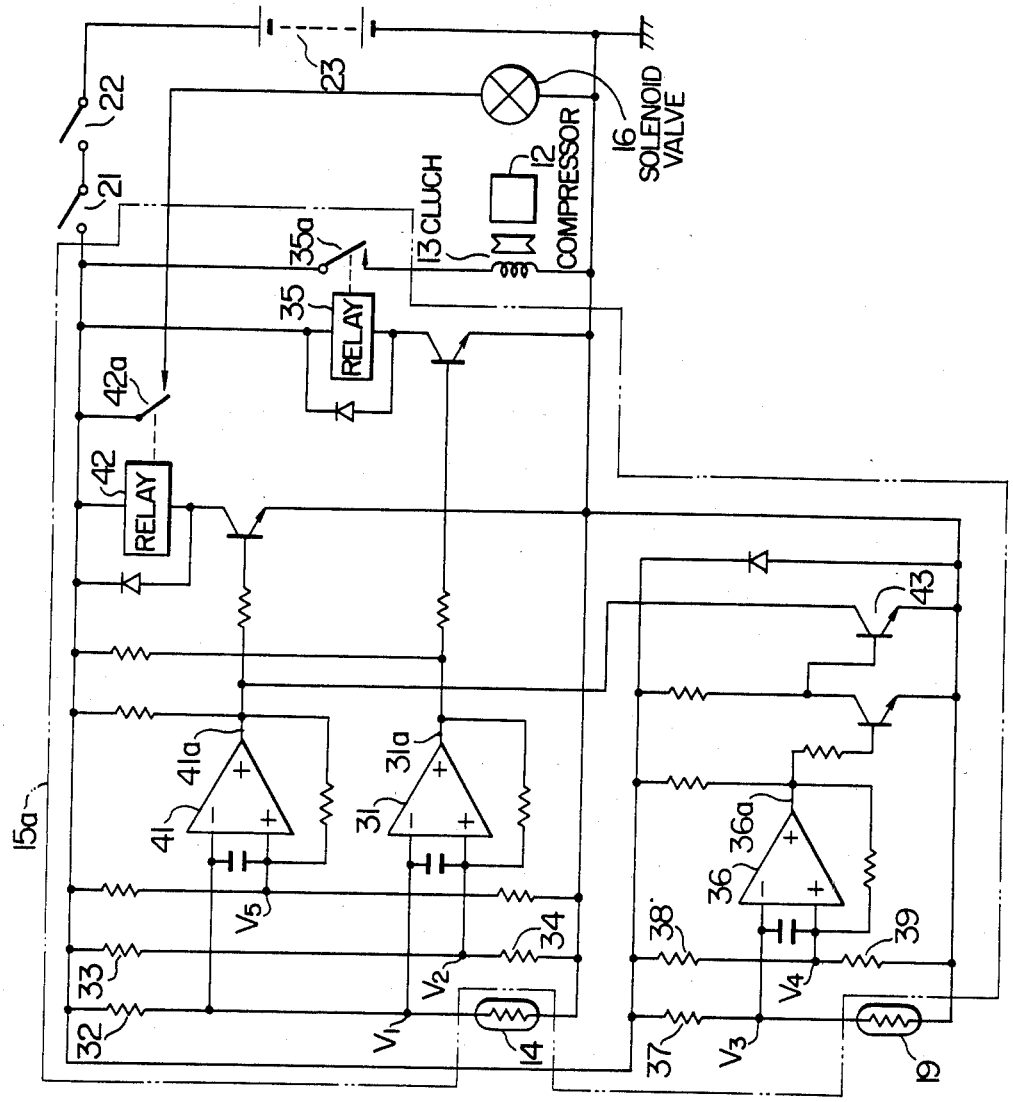
FIG. 11 shows a controlling electric circuitry of another embodiment of the invention.
Figure 12:
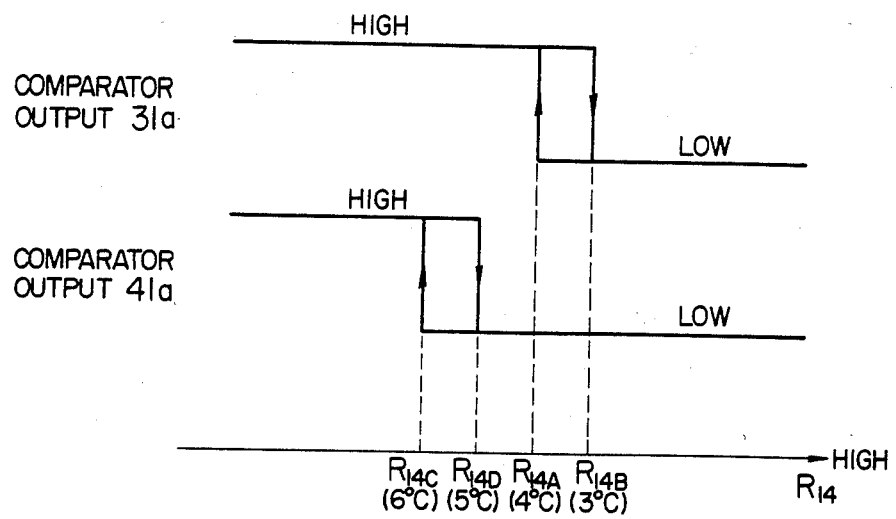
FIG. 12 illustrates the operation characteristics of the comparators of the electric circuitry shown in FIG. 11.

FIG. 11 shows a modified embodiment of the invention. The modification comprises a controlling circuit 15a which is different from the controlling circuit 15 of the preceding embodiment substantially in the following points:

A third comparator 41 is added to the controlling circuit 15 of the preceding embodiment. This comparator 41 is operative to produce an output 41a which is determined by the electric potential V1 and a reference potential V5. The potential V1 is determined by the resistance R14 of the thermistor of the temperature detector 14, as described previously. The comparator output 41a is utilized to control a relay 42 which is substituted for the relay 40 of the controlling circuit 15 of the preceding embodiment and which is operative to electrically energize and deenergize the solenoid valve 16. The reference potential V5 is selected to be lower than the reference potential V2 for the comparator 31 (namely, V5<V2). Relative to the thermistor resistance R14, therefore, the comparator outputs 31a and 41a vary as diagramatically shown in FIG. 12.

The comparator 36 of the controlling circuit 15a produces an output 36a which is of the same characteristic as that shown in FIG. 6A. In the modified embodiment shown in FIG. 11, the comparator output 36a is utilized to switch a transistor 43 on and off to control the relay 42.

In operation, if the air temperature within the occupant compartment is higher than 26° C. and the resistance R19 of the thermistor of the temperature detector 19 is less than R19A (see FIG. 6B), the output 36a of the comparator 36 is at its "HIGH" level to keep the transistor 43 in its "ON" state. At this time, if the air temperature just downstream of the evaporator is higher than 6° C., the outputs 31a and 41a of the two comparators 31a and 41 are both at "HIGH" levels (see FIG. 12), so that the relay 35 is electrically energized to close the normally open contact 35a and the relay 42 is simultaneously energized to open the normally closed contact 42a. Accordingly, the electromagnetic clutch 13 is engaged to cause the compressor 12 to be operated by the engine, while the solenoid operated pilot valve 16 is deenergized so that the valve 115 blocks the unloading port P to adjust the compressor 12 to be operated at its maximum (100%) displacement capacity. The air temperature just downstream of the evaporator is gradually lowered. If this air temperature is lowered to a level less than 5° C., the resistance R14 of the thermistor of the temperature detector 14 is increased to a level higher than R14D (FIG. 12) and the output 41a of the comparator 41 becomes "LOW" level so that the relay 42 is switched on to electrically energize the solenoid operated pilot valve 16 whereby the unloading port P of the compressor 12 is opened to cause the compressor to be operated at its reduced or small displacement capacity which is equal to about 30 to 50% of the maximum capacity. If the air temperature just downstream of the evaporator is further lowered to a level less than 3° C. and the thermistor resistance R14 is increased to a level higher than R14B, the comparator output 31a becomes "HIGH" level (FIG. 12) to switch the relay 35 off so that the electromagnetic clutch 13 is disengaged to stop the compressor operation to gradually raise the air temperature just downstream of the evaporator. As such, the modes of the compressor operation can be changed as follows:

Stop⇌Small capacity operation⇌
Large capacity operation

When the occupant compartment temperature is lowered to a level less than 24° C., the thermistor resistance R19 is increased to a level higher than R19B and thus the comparator output 36a becomes "LOW" level to switch the transitor 43 on. This forcibly lowers the comparator output 41a to "LOW" level so that the relay 42 is switched on to electrically energize the solenoid operated pilot valve 16 to thereby cause the compressor 12 to be operated at its reduced or small displacement capacity. This small capacity compressor operation is stopped and restarted in accordance with the levels of the comparator output 31a. In other words, the small capacity compressor operation and the stop of the operation are cyclically repeated when the occupant compartment is at a low temperature.

Figure 13:
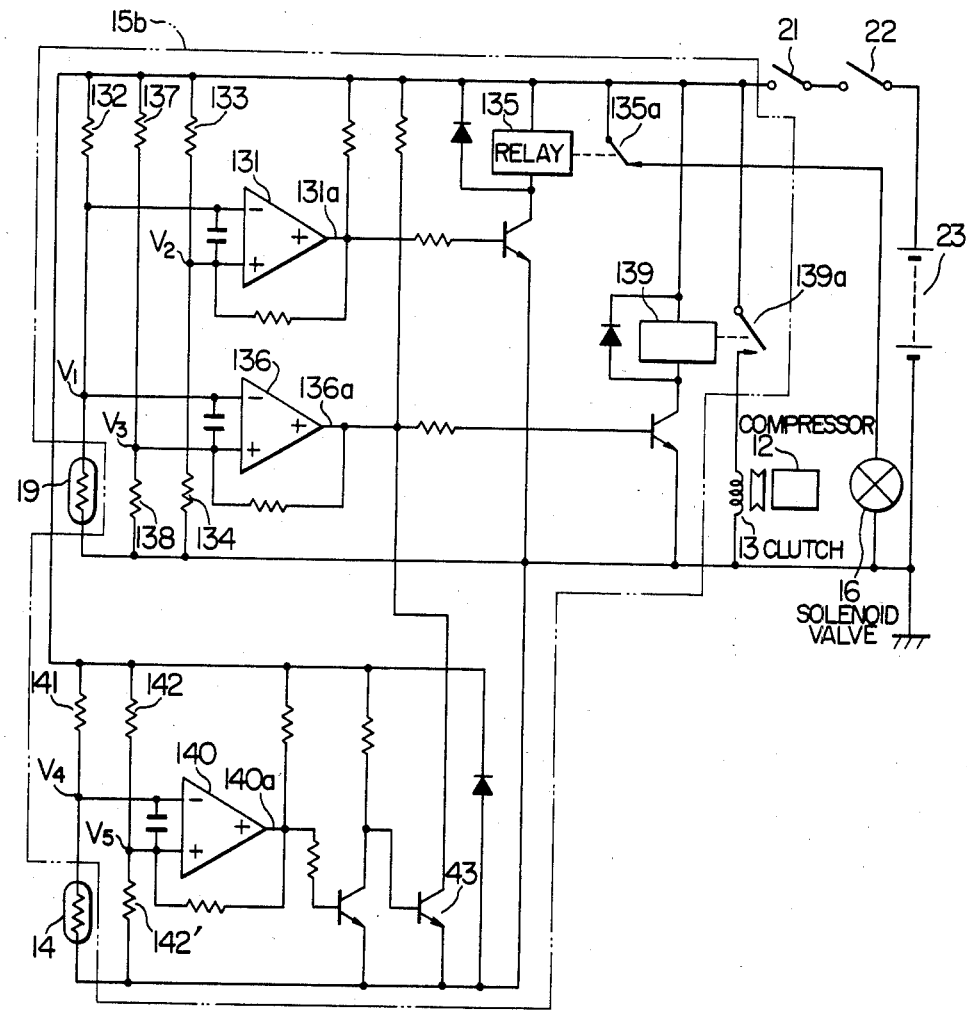
FIG. 13 shows a controlling electric circuitry of a further embodiment of the invention.

FIG. 13 shows a further modified embodiment of the invention. The modification comprises a controlling circuit 15b which includes a comparator 131 operative to produce an output 131a which is determined by an electric potential V1 and a reference potential V2. The potential V1 is dependent on the resistance of a resistor 132 and the resistance R19 of the thermistor of the temperature detector 19, while the reference potential V2 is dependent on the resistance of resistors 133 and 134. The comparator output 131a is utilized to control a relay 135 which is operative to electrically energize and deenergize the solenoid operated pilot valve 16. A second comparator 136 is operative to produce an output 136a which is determined by the electric potential V1 and a reference potential V3 which is dependent on the resistances of resistors 137 and 138. A relay 139 is controlled by the comparator output 136a to electrically energize and deenergize the coil (not shown) of the electromagnetic clutch 13. A third comparator 140 is operative to produce an output 140a which is determined by electric potentials V4 and V5. The potential V4 is dependent on resistance R14 of the thermistor of the temperature detector 14 and the resistance of a resistor 141, while the potential V5 is dependent on the resistances of resistors 142 and 142'. The comparator output 140a is utilized to switch on and off a transistor 143 which in turn is operative to control the operation of the relay 139.

Figure 14A:
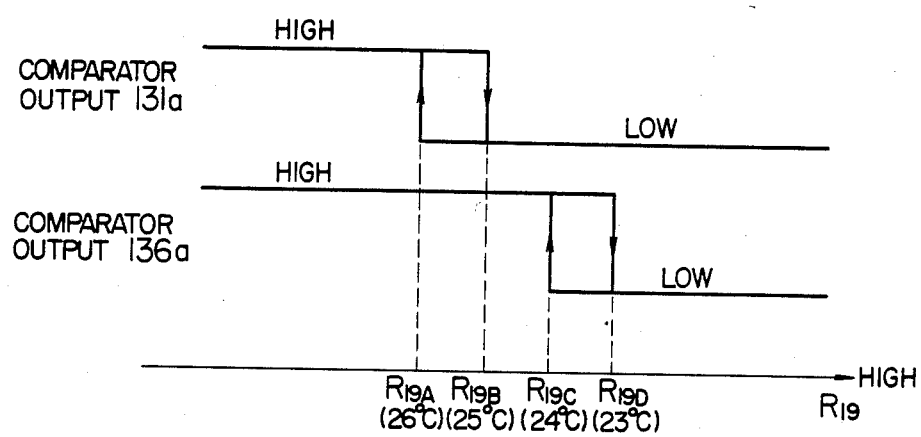
FIGS. 14A and 14B illustrate the operation characteristics of the comparators of the electric circuitry shown in FIG. 13.
Figure 14B:
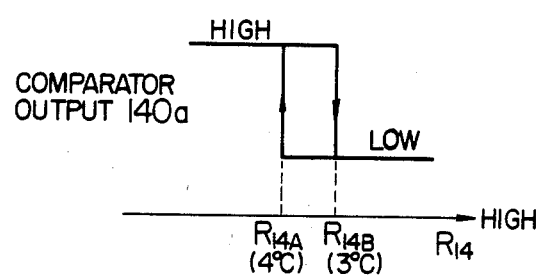

The thermistors of the temperature detectors 14 and 19 are of negative characteristics and have resistances which decrease as the temperatures detected thereby are increased. FIGS. 14A and 14B show the relationship between the variations in the thermistor resistances R19 and R14 and the changes of the comparator outputs 131a, 136a and 140a.

As shown in FIG. 14A, the comparator output 131a becomes "HIGH" level when the occupant compartment temperature is increased beyond a preset temperature of 26° C. and the thermistor resistance R19 is decreased to a level less than R19A. The comparator output 131a becomes "LOW" level when the occupant compartment temperature is lowered to a level lower than a preset temperature of 25° C. and the thermistor resistance R19 is increased beyond a level higher than R19B. Similarly, the comparator output 136a becomes "HIGH" level when the thermistor resistance R19 is reduced beyond a level lower than R19C, while the comparator output 136a becomes "LOW" level when the thermistor resistance R19 is increased beyond a level higher than R19D. The comparator output 140a becomes "HIGH" level when the air temperature just downstream of the evaporator is increased beyond 4° C. and the thermistor resistance R14 of the temperature detector 14 is decreased beyond a level lower than R14A, as shown in FIG. 14B. The comparator output 140a becomes "LOW" level when the air temperature just downstream of the evaporator is lowered beyond 3° C. and the thermistor resistance R14 is increased to a level higher than R14B.

In operation, assuming that the occupant compartment temperature is higher than the upper limit of a first preset temperature range of from 24° C. to 26° C. and the thermistor resistance R19 of the temperature detector 19 is lower than R19A, the comparator output 131a is at its "HIGH" level so that a normally closed contact 135a of the relay 135 is opened to deenergize the solenoid-operated valve 16. Thus, the valve 16 is in its positon shown in FIG. 10 in which the valve member 16e is positioned to communicate the compressor discharge pressure inlet port 16b with the pressure outlet port 16c so that the valve member 115a of the valve 115 is forced to block the unloading port P to adjust the compressor 12 so as to be operated at its maximum (100%) displacement capacity.

Under the condition discussed, if the air temperature just downstream of the evaporator is higher the upper limit of a preset temperature range of from 3° C. to 4° C., the thermistor resistance R14 of the temperature detector 14 is lowered to a level lower than R14A, so that the comparator output 140a becomes "HIGH" level. Thus, the transistor 143 is switched off to allow the normally open contact 139a of the relay 139 to be actuated solely by the comparator output 136a. Under this condition, if the occupant compartment temperature rises to, for example, 26° C. which is higher than a second preset temperature range of from 23° C. to 24° C., the thermistor resistance R19 of the temperature detector 19 is lowered to a level less than R19C and the comparator output 136a becomes "HIGH" level. The comparator output 136a, therefore closes the normally open relay contact 139a to engage the electromagnetic clutch 13 with a result that the compressor 12 is operated at its maximum displacement capacity.

With the occupant compartment temperature being kept higher than 26° C., if the air pressure just downstream of the evaporator is lowered beyond the lower limit of the preset temperature range of from 3° C. to 4° C., the thermistor resistance R14 is increased beyond R14B and thus the comparator output 140a becomes "LOW" level. Thus, the transistor 143 is switched on so that the comparator output 140a at the "LOW" level cancels the comparator output 136a at the "HIGH" level so that the relay 139 receives a "LOW" level of input with a result that the normally open contact 139a is opened to disengage the clutch 13. Thus, the compressor operation is interrupted or stopped in its maximum displacement capacity condition. On the other hand, when the occupant compartment temperature is kept higher than the first preset temperature range of from 25° C. to 26° C. and if the air temperature just downstream of the evaporator rises to a level higher than the preset temperature range of from 3° C. to 4° C., the thermistor resistance R14 is reduced to a level less than R14A and thus the comparator output 140a becomes "HIGH" level. The transitor 143, therefore, is switched off so that the relay 139 now receives the "HIGH" level of the comparator output 136a to close the normally closed relay contact 139a for thereby engaging the electromagnetic clutch 13. Thus, the compressor operation is restarted in the maximum displacement capacity condition.

When the occupant compartment temperature is lowered to a level lower than the lower limit of the first preset temperature range of from 25° C. to 26° C. and the thermistor resistance R19 is increased to a level higher than R19B, the comparator output 131a becomes "LOW" level so that the relay contact 135a is closed to energize the solenoid valve 16. Thus, the valve member 16e of the valve 16 is electromagnetically actuated to block the compressor discharge pressure inlet port 16b and opens the compressor intake pressure inlet port 16a, so that the valve member 115a of the valve 115 is moved away from the unloading port P by the spring 115b. Thus, the compressor 12 is adjusted to be operative at its small or reduced displacment capacity.

On the other hand, if the occupant compartment temperature rises from a level lower than 25° C. to a level higher than the upper limit of the first preset temperature range of from 25° C. to 26° C. and the thermistor resistance R19 is decreased to a level lower than R19A, the comparator output 131a becomes "HIGH" level so that the normally closed relay contact 135a is opened to cause the valve member 16 of the solenoid valve 16 to be returned to the position to open the compressor discharge pressure inlet port 16b whereby the unloading port P is closed by the valve member 115a to render the compressor 12 adjusted to be operative at its maximum displacement capacity.

In the case where the occupant compartment temperature is at a level between the first preset range of from 25° C. to 26° C. and the second preset temperature range of from 23° C. to 24° C., the compressor 12 is adjusted to be at the small or reduced displacement capacity. On the other hand, the start and stop of the compressor operation are controlled on the basis of the resistance R14 of the thermistor of the temperature detector 14 for the air temperature just downstream of the evaporator as in the case where the occupant compartment temperature is at a level higher than the first temperature range of from 25° C. to 26° C. In other words, the reduced displacement capacity operation of the compressor 12 will be stopped when the thermistor resistance R14 is increased to a level higher than R14B. The compressor 12 is restarted at its reduced displacement capacity when the thermistor resistance R14 is decreased to a level lower than R14A.

When the occupant compartment temperature is lowered to a level lower than the lower limit of the second preset temperature range of from 23° C. to 24° C. and the resistance R19 of the thermistor of the temperature detector 19 for the occupant compartment temperature is increased to a level higher than R19D, the comparator output 136a becomes "LOW" level so that the normally open relay contact 139a is opened to disengage the clutch 13 for thereby interrupting or stopping the operation of the compressor 12. It is to be noted that the comparator output 140a related to the air temperature just downstream of the evaporator is operative only to switch the transistor 143 on and change the level of the comparator output 136a from "HIGH" to "LOW". The comparator 140 is not capable of changing the comparator output 136a from the "LOW" level to "HIGH" level. For this reason, when the occupant compartment temperature is lower than the lower limit of the second preset temperature range, the operation of the compressor 12 cannot be started irrespective of the air temperature just downstream of the evaporator.

As described, the emobodiment of the invention shown in FIG. 13 is arranged such that, when the occupant compartment temperature is high and calls for a high cooling capacity, the maximum displacement compressor operation and the stoppage thereof are exchanged repeatedly such that, when the occupant compartment temperature is relatively low and calls for a reduced cooling capacity, the reduced displacement compressor operation and the stoppage thereof are exchanged repeatedly to prevent the frosting of the evaporator. With regard to the variation in the occupant compartment temperature, the compressor operation is controlled such that the maximum displacement operation, the reduced displacement operation and stoppage of the operations are changed one from another so as to keep the occupant compartment temperature within the preset temperature range or, in other words, so as to minimze the fluctuation of the occupant compartment temperature. As such, the refrigeration cycle is operated with variable capacity which is just suited for the demand. This is advantageous in the view points of power consumption and operation noise.

Figure 15:
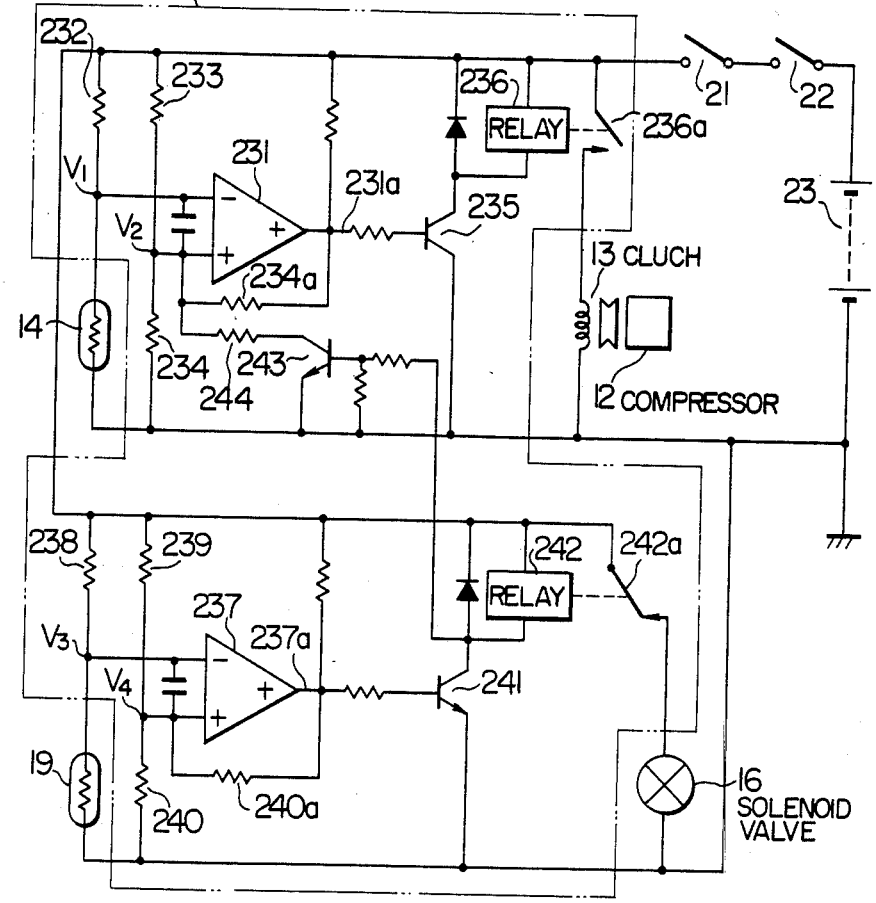
FIG. 15 shows a controlling electric circuitry of a still further embodiment of the invention.

FIG. 15 shows a further modified embodiment of the invention. The modification comprises a controlling circuit 15c including a comparator 231 operateive to produce an output 231a which is determined by an electric potential V1 and a refernce potential V2. The potential V1 is dependent on the resistance of a resistor 232 and the resistance R14 of the thermistor of the temperature detector 14 for the air temperature just downstream of the evaporator 5. The reference potential V2 is dependent on the resistances of resistors 233, 234 and 234a. A transitors 235 is switched on and off by the comparator output 231a to control the operaton of a relay 236 which has a relay contact 236a adapted to be opened and closed to electrically energize and deenergize the electromagnetic coil (not shown) of the electromagnetic clutch 13.

The controlling circuit 15c also includes a second comparator 237 which is operative to produce an output 237a which is determined by an electric potential V3 and a reference potential V4. The potential V3 is dependent on the resistance of a resistor 239 and the resistance R19 of the thermistor of the temperature detector 19 for the occupant compartment temperature, while the potential V4 is dependent on the resistances of resistors 239, 240 and 240a. A transistor 241 is adapted to be switched on and off by the comparator output 237 to control the operation of a relay 242 having a relay contact 242a adapted to be opened and closed to control the elecrical supply to the solenoid operated pilot valve 16. The switching on and off of the transistor 241 is utilized to switch a transistor 243 on and off. When the transistor 243 is switched on, a resistor 244 is connected to the plus terminal of the comparator 231 in parallel relationsip to the resistor 234 so that a different or second refernece potential V2' is applied to the comparator 231. The second referenece potential V2' is smaller than the intial or first refernece potential V2 (namely, V2'<V2).

Figure 16A:
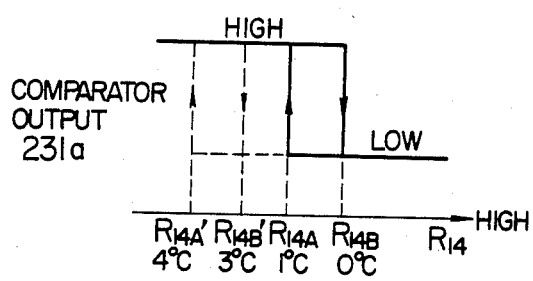
FIGS. 16A and 16B illustrate the operation characteristics of comparators of the electric circuitry shown in FIG. 15.
Figure 16B:
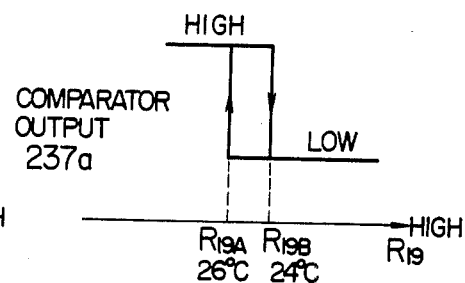

The relationship between the thermistor resistance R14 and the comparator output 231a and between the thermistor resistance R19 and the comparator output 237a are shown in FIGS. 16A and 16B.

When the comparator output 273a is at its "HIGH" level, the transistor 241 is switched on and the transistor 243 is switched off, so that the comparator 231 receives the first refernece potential V2 which is greater than the second reference potential V2'. In this caes, if the air temperature just downstream of the evaporator rises beyond 1° C. and the thermistor resistance R14 is reduced to a level lower than R14A, the comparator output 231a becomes "HIGH" level, as shown by the solid lines in FIG. 16A. Thus, the transistor 235 is switched on to close the relay contact 236a so that the clutch 13 is engaged to cause the compressor 12 to be started. If the air temperature just downstream of the evaporator is lowered beyond 0° C. and the thermistor resistance R14 is increased to a level higher than R14B, the comparator output 231a becomes "LOW" level to switch the transistor 235 off so that the relay contact 236a is returned to its open position to disengage the clutch 13 whereby the operation of the compressor 12 is stopped.

When the comparator output 237a is at its "LOW" level, the transistor 241 is switched off so that the relay 242 does not operate and its normally closed contact 242a is kept closed to electrically energize the solenoid operated pilot valve 16. The switching-off of the transistor 241 is operative to cause an electric voltage to be applied to the base terminal of the transistor 243, so that this transistor is switched on to cause the resistor 244 to be connected to the comparator 231 in parallel with the resistor 234. Thus, the reference potential for the comparator 231 is varied from V2 to V2' which is smaller than V2 with a result that the comparator output 231a is shifted from the higher temperature range to a lower temperature range, as shown by broken lines in FIG. 16A.

The comparator output 237a becomes "HIGH" level when the occupant compartment temperature rises beyond 26° C., for example, and the thermistor resistance R19 is decreased to a level lower than R19A, as shown in FIG. 16B. When the occupant compartment temperature is lowered to a level lower than 24° C., for exmaple, and the thermistor resistance R19 is increased to a level higher than R19B, the comparator output 237a becomes "LOW" level.

In operation, if the occupant compartment temperature is higher than 26° C. and the thermistor resistance R19 is smaller than R19A, the comparator output 237a is at its "HIGH" level. Thus, the transistor 241 is in its "ON" state so that the normally closed contact 242a of the relay 242 is opened to deenergize the solenoid operated valve 16. Thus, the valve 16 is in the position shown in FIG. 10 in which the valve member 16e unblocks the compressor discharge pressure inlet port 16b to cause the valve member 115a of the valve 115 to be moved to close the unloading port P by the compressor discharge pressure whereby the compressor 12 is adjusted to be operative at its maximum (100%) displacement capacity. As the transistor 241 is in its "ON" state, the transistor 243 is switched off to render the resistor 244 ineffective so that the reference potential for the comparator 231 is solely determined by the resistors 233, 234 and 234a, namely, V2.

Under the condition described, if the air temperature just downstream of the evaporator is higher than the upper limit of the temperature range of from 0° C. to 1° C. (note that, at this time, the reference potential for the comparator 231 is V2), the thermistor resistance R14 is smaller than R14A, so that the comparator output 231a is at its "HIGH" level. Thus, the transistor 235 is switched on to close the relay contact 236a for thereby causing the clutch to be engaged. The compressor 12, therefore, is operated at its maximum displacement capacity.

When the air temperature just downstream of the evaporator is lowered to a level lower than 0° C., the thermistor resistance R14 is increased to a level greater than R14B, and, consequently, the comparator output 231a becomes "LOW" level to switch the transistors 235 off so that the relay contact 236a is opened to disengage the clutch 13. Thus, the operation of the compressor 12 is stopped to prevent the frosting of the evaporator 5.

When the occupant compartment temperature is lowered to a level lower than the lower limit of the temperature range of from 24° C. to 26° C. and the thermistor resistance R19 is increased to a level greater than R19B, the comparator output 237a becomes "LOW" level to switch the transistor 241 off so that the normally closed relay contact 242a is closed to electrically energize the solenoid operated pilot valve 16. Thus, the valve member 16e of the valve 16 is electromagnetically actuated by the coil 16d to the position to block the compressor discharge pressure inlet port 16b and unblock the compressor intake pressure inlet port 16a, so that the valve member 115a of the valve 115 is urged by the spring 115b away from the unloading port P. The compressor 12, therefore, is adjusted to be operative at its reduced or small displacement capacity which is approximately equal to 30 to 50% of the maximum capacity. As the transistor 241 is in its "OFF" state, an electrical voltage is applied to the base terminal of the transistor 243 to switch this transistors on so that the resistor 244 is connected to the plus terminal of the comparator in parallel relationship with the resistor 234. Therefore, the reference potential for the comparator 231 is now changed from V2 to V2' which is smaller than V2, whereby the value of the thermistor resistance R14 which influences the magnitude of the comparator output 231a is reset from the lower range between R14A (for 1° C.) and R14B (for 0° C.) to a higher range between R14A' (for 4° C.) and R14B' (for 3° C.), as diagrammatically illustrated in FIG. 16A.

Under the condition discussed, if the air temperature just downstream of the evaporator 5 is higher than 4° C., the thermistor resistance R14 is smaller than R14A' and, consequently, the comparator output 231a is at its "HIGH" level, so that the relay contact 236a is closed to cause the clutch 13 to be engaged. Accordingly, the operation of the air conditioner is adjusted such that the displacement of the compressor 12 is at its reduced or small stage and the air temperature just downstream of the evaporator is set to be within the higher range of from 3° C. to 4° C. If the air temperature just downstream of the evaporator is lowered to a level lower than 3° C., the thermistor resistance R14 is increased to a level higher than R14B' with a resultant change of the comparator output 231a form the "HIGH" level to the "LOW" level. Thus, the normally closed relay contact 236a is opened to disengage the clutch 13 whereby the opertion of the compressor 12 is stopped.

According to the embodiment described, therefore, when the occupant compartment temperature is high and calls for a large cooling capacity, the maximum capacity operation of the compressor 12 and the stop of the operation are switched over with the temperature setting for preventing the frosting of the evaporator being set within the lower temperature range to improve the rate of cooling of the occupant compartment.

In the case where the occupant compartment temperature is low and does not call for a high cooling capacity, the compressor 12 is operated at its small or reduced displacement capacity while the temperature setting for the air temperature just downstream of the evaporator 5 is set within the higher range to reliably prevent the frosting of the evaporator 5. In addition, the maximum and small displacement capacity operations of the compressor 12 and the stoppage thereof may be selectively combined to reduce the load on the engine as well as to provide a favorable air conditioning in the occupant compartment.

Figure 17:
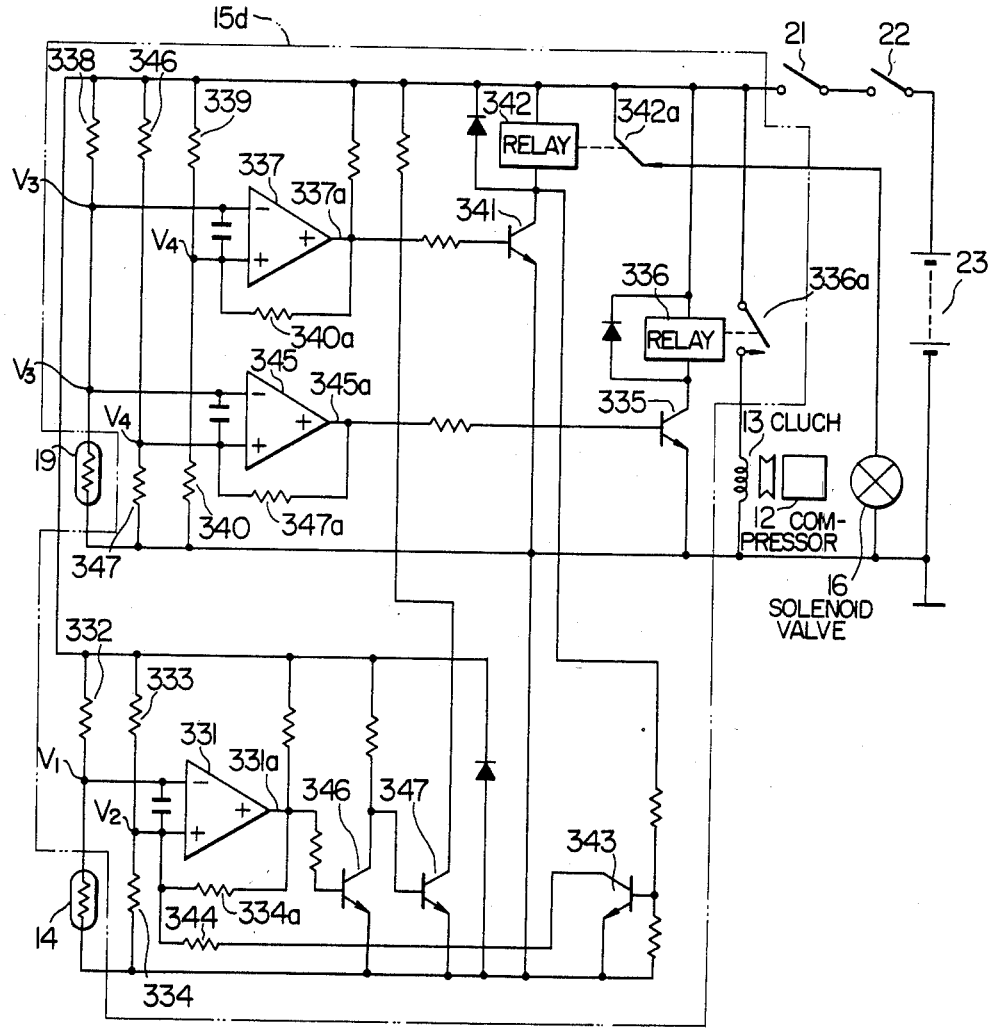
FIG. 17 shows a controlling electric circuitry of a still further embodiment of the invention.
Figure 18A:
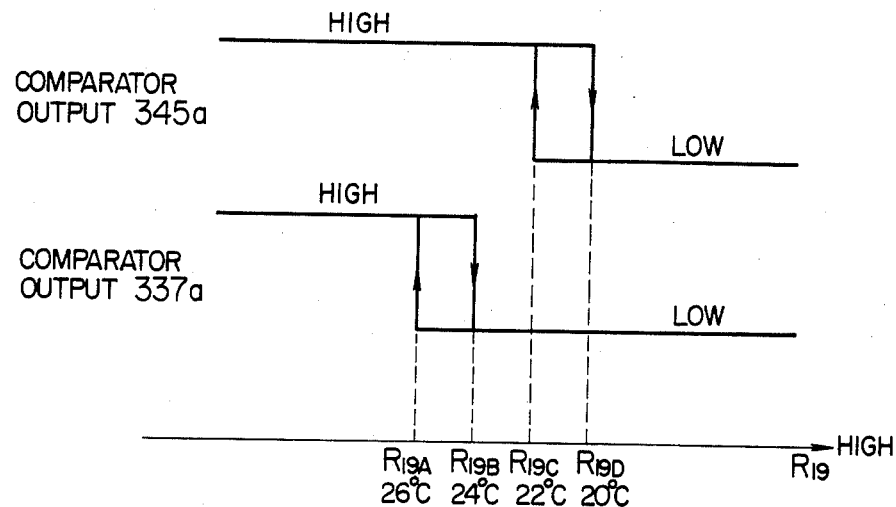
FIGS. 18A and 18B illustrate the operation characteristics of the comparators of the electric circuitry shown in FIG. 17.

FIG. 17 shows a further modified embodiment of the invention. The modification comprises a controlling circuit 15d. The primary difference of the circuit 15d from the circuit 15c shown in FIG. 15 is that a third comparator 345 is added to provide two kinds of temperature settings for the occupant compartment. The comparator 345 is operative to produce an output 345a which is determined by an electric potential V3 and a refernece potential V5. The potential V3 is dependent on the resistance of a resistor 338 and the resistance R19 of the themistor of the occupant compartment temperature detector 19, while the potential V5 is dependent on the resistances of newly provided resistors 346, 347 and 347a. The reference potential V5 for the comparator 345 is higher than a reference potential V4 for a comparator 337 (i.e., V5>V4). The outputs 337a and 345a of the comparators 337 and 345 are varied with respect to the variation in the resistance R19 of the occupant compartment temperature detector 19 in the manner shown in FIG. 18A. More specifically, the comarator output 345a becomes "HIGH" level when the occupant compartment temperature rises to a level higher than a lower preset temperature range of from 20° C. to 22° C., as shown in FIG. 18A. The comparator output 345abecomes "LOW" level when the occupant compartment temperature is lowered to a level lower than the lower preset temperature level. When the comparator output 345a is at its "HIGH" level, a transistor 335 is switched on to actuate a relay 336 so that a normally open relay contact 336a is closed to engage the clutch 13 for thereby causing the compressor to be operated. When the comparator output 345a is at its "LOW" level, the transistor 335 is switched off to open the relay contact 336a so that the clutch is disengaged to stop the compressor operation.

Another difference of the circuit 15d from the circuit 15c is that the path of the transfer of an output 331a of a comparator 331 is different from that of the circuit 15c shown in FIG. 15. Namely, the comparator output 331a is applied to the base terminal of a transistor 346 which is switched on when the comparator output 331a is at "HIGH" level. At this time, no voltage is applied to the base terminal of another or succeeding transistor 347. Thus, the succeeding transistor 347 is switched off. When the transistor 347 is in its "OFF" statge, the comparator output 345a is applied to the base terminal of the transistor 335. When the comparator output 331ais at "LOW" level, the transistor 346 is switched off, so that the transistor 347 is switched on. Thus, the comparator output 345a is grounded and is not applied to the base terminal of the transistor 335 even if the comparator output 345a is at "HIGH" level. Thus, the transistor 335 is switched off so that the relay contact 336a is opened to disengage the clutch 13 for thereby stopping the operation of the compressor 12.

Compared with the embodiment shown in FIG. 15, the embodiment shown in FIG. 17 is different in that two kinds of temperature settings are provided for the occupant compartment temperature and, when the occupant compartment temperature is lowered to a level lower than 20° C. and the thermistor resistance R19 is increased to a level higher than R19D, the compareator output 345a becomes "LOW" level (see FIG. 18A) to switch the transistor 335 off so that the normally open relay contact 336a is opened to disengage the clutch 13 whereby the operation of the compressor 12 is stopped.

Figure 18B:
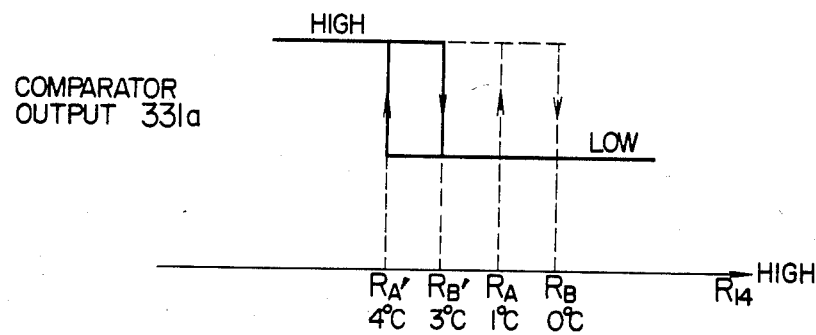

As is the embodiment shown in FIG. 15, the controlling circuit 15d includes a comparator 331 which is operative to produce an output 331a which is utilized to shift the preset temperature range of the air temperature just downstream of the evaporator 5 as shown in FIG. 18B. In the embodiment shown in FIG. 17, therefore, the temperature detector 19 is utilized to detect the occupant compartment temperature and, if the temperature thus detected is higher than the first or higher preset temperature range (from 24° C. to 26° C.), the compressor is operated at its maximum displacement capacity while the temperature setting for the air temperature just downstream of the evaporator 5 is set to be within the lower temperature range (from 0° C. to 1° C.). If the occupant compartment temperature is lower than the first or higher preset temperature range of from 24° C. to 26° C. but higher than the second or lower preset temperature range of from 20° C. to 22° C., the compressor 12 will be operated at is small or reduced displacement capacity while the temperature setting for the air temperature just downstream of the evaporator is set to be within a higher preset temperature ragne of from 3° C. to 4° C. If the occupant compartment temperature is lower than the second or lower preset temperature range of from 20° C. to 22° C., the clutch 13 is disengaged to stop the operation of the clutch. In the embodiment shown in FIG. 17, moreover, the temperature detector 14 is operated to detect the air temperature just downstream of the evaporator 5 and, if the occupant compartment temperature detected by the detector 19 is higher than the first or higher preset temperature range (24°-26° C.), the operation of the compressor 12 will be continued until the air temperature just downstream of the evaporator 5 is lowered to a level lower than the lower preset temperature range of from 0° C. to 1° C. to increase the cooling of the refrigeration system. On the other hand, if the occupant compartment temperature is lower than the first preset temperature range (24°-26° C.) and does not call for a high cooling capacity, the temperature setting for the air temperature just downstream of the evaporator 5 is set to be within the higher temperature range of from 3° C. to 4° C. to reliably prevent the frosting of the evaporator 5. For the above feature and arrangement of the embodiment shown in FIG. 17, the system is operative to provide a comfortable air conditioning in the occupant compartment while the compresor 12 is operated at its suitable displacement capacity to prevent the frosting of the evaporator.

Figure 19A:
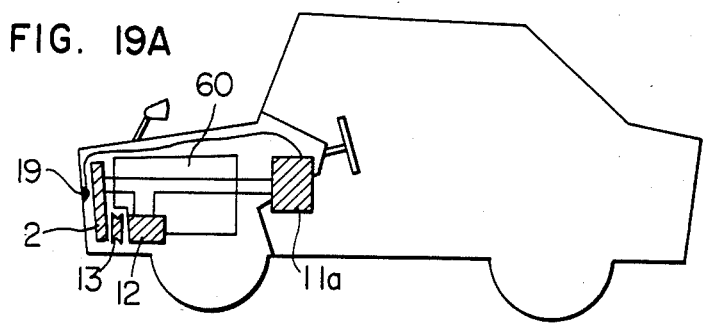
FIGS. 19A and 19B are diagrammatic illustrations of automobiles showing examples of the parts of the automobiles at which temperature detectors for ambient air temperatures are disposed.
Figure 19B:
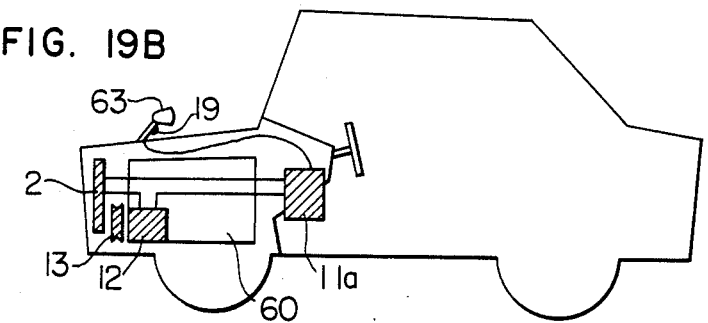

FIGS. 19A and 19B show further embodiments of the invention in which the air temperature detector 19 is disposed to detect the temperature of the ambient air outside automobiles. In each of the automobiles shown, the condensor 12, the compressor 12 and the clutch 13 are disposed in the engine compartment while an air conditioner unit 11a is disposed in the occupant compartment. The engine is designated by 60. In the embodiment shown in FIG. 19A, the air temperature detector 19 is disposed forwardly of the condenser 2, while the embodiment of FIG. 19B has its air temperature detector 19 disposed adjacent to an outdoor rear view mirror 63. The other points of each of the embodiments shown in FIGS. 19A and 19B are preferably identical to those of the first embodiment of the invention described with reference to FIGS. 4 to 10 of the drawings. Thus, the description of the operation of each of the embodiments of FIGS. 19A and 19B is entirely the sme as that of the first embodiment of the invention with only one exception that the words "occupant compartment temperature" or the like appearing in the description of the operation of the first embodiment of the invention should alternatively read "ambient air temperature" of the like.

Each of the embodiments shown in FIGS. 19A and 19B may alternatively include the controlling circuit 15a shown in FIG. 11. In such a case, the description of the operation of each of the embodiments of FIGS. 19A and 19B will be entirely identical to the operation of the controlling circuit 15a described with reference to FIGS. 4 and 7-12 with only one exception that the words "occupant compartment temperature" or the like should alternatively read "ambient air temperature" or the like.

For the above reasons, the description of the operation of each of the embodiments shown in FIGS. 19A and 19B is omitted herein.

Figure 20:
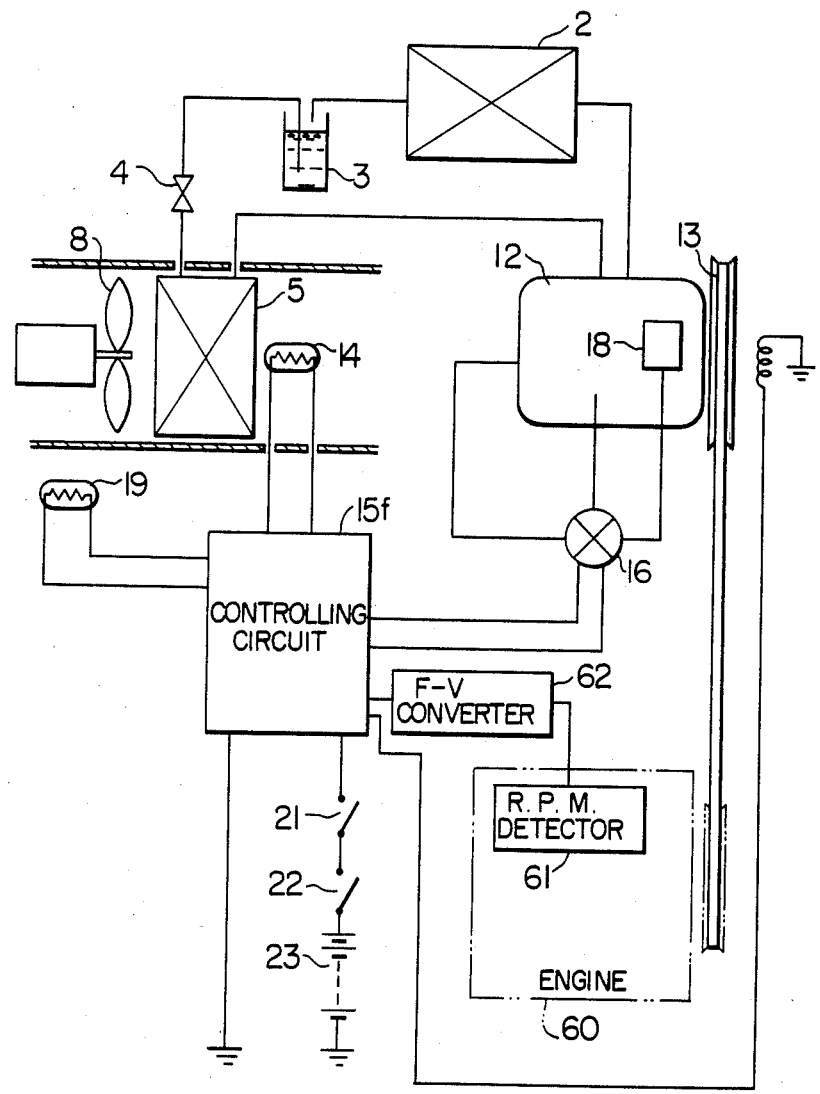
FIG. 20 is a view similar to FIG. 4 but illustrates a still further embodiment of the invention.

FIG. 20 shows a still further embodiment of the invention. The embodiment includes an engine speed detector 61 provided in addition to elements which are identical or similar to those included in the preceding embodiments of the invention. The engine speed detector 61 is operative to detect the speed of an associated internal combustion engine 60 and emit an electrical signal having a frequency proportioned to the engine speed thus detected. The engine speed signal is received by an F-V converter 62 which converts the signal into a voltage signal having an electrical voltage proportioned to the engine speed. The voltage signal is fed into a controlling circuit 15f. A temperature detector 19 is disposed to detect the temperature of the ambient air outside the automobile on which the refrigeration system is mounted. The detector 19 emits an ambient air temperature signal to the controlling circuit 15f. Another temperature detector 14 is disposed just downstream of an evaporator 5 to detect the air temperature just downstream thereof and emit a signal to the controlling circuit 15f.

The controlling circuit 15f is operative in response to the three singals to control a solenoid-operated valve 16 for thereby varying the displacement capacity of a compressor 12 stepwise. The controlling circuit 15f is also operative to control the engagement and disengagment of an electromagnetic clutch 13 so that the compressor 12 is interruptedly operated.

The other points of the embodiments shown in FIG. 20 are subtantially identical to those of the embodiment shown in FIGS. 4, 7, 8, 9 and 10 except the structural details and function of the controlling circuit 15f which will be discussed hereunder with reference to FIG. 21.

Figure 21:
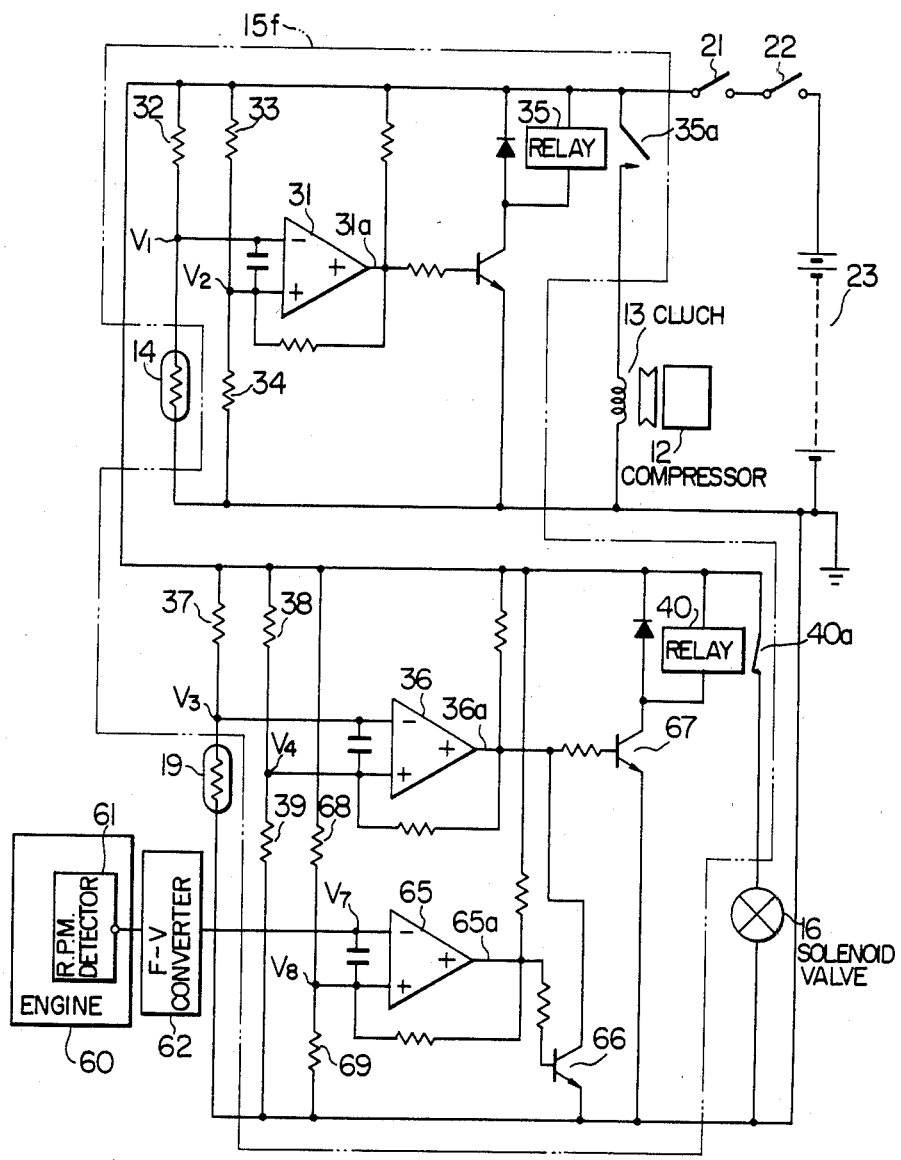
FIG. 21 shows a controlling electric circuitry used in the system shown in FIG. 20.

The controlling circuit 15f shown in FIG. 21 has a similarlity at many points to the controlling circuit 15 shown in FIG. 5. The difference will be described hereunder. The circuit 15f includes a comparator 65 having a minus temrinal to which the voltage signal V7 emitted by the F-V converter 62 is applied. To the plus terminal of the comparator 65 is applied a reference potential V8 which is determined by the resistances of resistors 68 and 69. The comparator produces an output 65a which is dependent on the potentials V7 and V8. The comparator output 65a is utilized to switch transistors 66 and 67 on and off to control the solenoid operated valve 16.

The engine speed detector 61 may preferably detect the engine speed on the basis of interrupted electrical signal derived either from an engine ignition coil or an alternator. The speed detector 61 may alternatively be formed by a conventional photoelectrical rpm detector.

The controlling circuit 15f also includes comparator 31 and 36. The operations of these comparators are the same as those of the comparators 31 and 36 shown in FIG. 5. The comparators 31 and 36 produce outputs 31a and 36a the levels of which are changed between "HIGH" and "LOW" as the resistances R14 and R19 of the thermistors of the temperature detectors 14 and 19 are varied, as previously discussed with reference to FIGS. 6A and 6B.

Figure 22A:
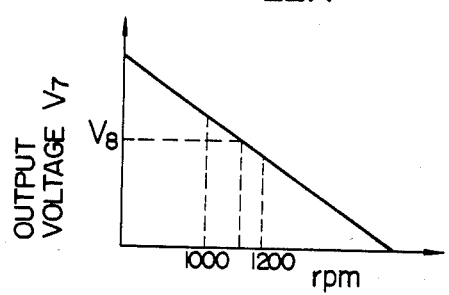
FIG. 22A illustrates the operation characteristic of the FV converter shown in FIG. 21.
Figure 22B:
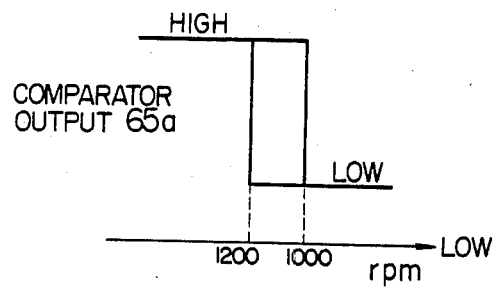
FIG. 22B illustrates the operation characteristic of a comparator shown in FIG. 21.

FIG. 22A illustrates the opeation characteristic of the F-V converter 62, namely the relationship between the engine speed signal applied to the F-V converter and the output voltage signal thereof. FIG. 22B illustrates the operation characteristic of the comparator 65, namely the relationship between the engine speed and the comparator olutput 65a.

As will be seen in FIG. 22A, when the engine speed is increased beyond 1200 rpm and the comparator input singal V7 is lowered to a level lower than the reference potential V8, the comparator output 65a becomes "HIGH" level, as shown in FIG. 22B. On the other hand, when the engine speed is decreased below 1000 rpm and the comparator input signal V7 is incresed beyond the reference potential V8, the comparator output 65a becomes "LOW" level.

In operation, if the ambient air temperature outside the automobile is higher than 26° C. and the thermistor resistance R19 is smaller than R19A, the comparator output 36a is at "HIGH" level, as will be seen in FIG. 6B. Thus, the transistor 67 is switched on to open the normally closed relay contact 40a, so that the solenoid operated valve 16 is not electrically energized. Thus, the compressor 12 is adjusted to be opeative at its maximum displacement capacity. At this time, if the engine speed is less than 1000 rpm, the comparator output 65a is at "LOW" level to keep the transistor 66 in "OFF" state so that the transistor 66 is not operative to influence the operation of the solenoid operated valve 16. In other words, the compressor 12 is kept adjusted to be operative at its maximum displacement capacity.

If the engine speed is increased above 1200 rpm, the comparator output 65a becomes "HIGH" level to switch the transistor 66 on to ground the comparator output 36a. Thus, the transistor 67 is switched off so that the relay contact 40a is closed to electrically energize the solenoid valve 16. As a result, the compressor 12 is adjusted to be operative at its reduced or small displacement capacity approximately equal to 30 to 50% of its maximum displacement capacity, for the reasons described previously.

In the case where the ambient air temperature is lower than 24° C. and the thermistor resistance R19 is greater than R19A, the comparator output 36a is at "LOW" level (see FIG. 6B) to keep the transistor 67 in its "OFF" state, so that the normally closed relay contact 40a is returned to its normal or closed position to electrically energize the solenoid valve 16. As a result, the compressor 12 is adjusted to be operative at its reduced or small displacement capacity.

Under this condition, because the comparator output 36a is kept at "LOW" level irrespective of the engine speed and thus the comparator output 65a and hence irrespective of whether the transistor 66 is in "ON" state or not, the compressor displacement is set to be small.

As such, the compressor 12 is adjusted to be operative at its maximum displacement capacity only when the ambient air temperature is higher than 26° C. and the engine speed is higher than 1000 rpm. On the other hand, the compressor 12 is adjusted to be operative at its reduced displacement capacity when either the ambient air temperature or the engine speed is outside the above condition.

If the air temperature just downstream of the evaporator 5 is higher than 4° C., the comparator output 31a is at "HIGH" level to keep the normally open relay contact 35a closed to engage the clutch 13 so that the compressor 12 is operated at its displacement capacity which is adjusted as above. When the air temperature just downstream of the evaporator is lowered to a level lower than 3° C., the comarator output 31a becomes "LOW" level to open the normally open relay contact 35a so that the clutch 13 is disengaged to stop the operation of the compressor 12 for preventing the frosting of the evaporator 5.

As described, the embodiment of FIG. 21 is arranged such that, when the ambient air temperature outside the automobile is high and the engine speed is low with a resultant small cooling capacity of the refrigeration system, the displacement of the compressor 12 is adjusted to be at the maximum capacity to compensate for the small cooling capacity of the refrigeration system due to the low engine speed. At this time, however, the compressor 12 is operated intermittently to prevent the frosting of the evaporator. On the other hand, either if the ambient air temperature is low and does not need a high cooling capacity or if the engine speed is high and can provide a high cooling capacity, the displacement of the compressor 12 is adjusted to be at its small or reduced capacity to pvevent over-cooling of the occupant compartment while the compressor is intermittently operated to prevent the frosting of the evaporator 5.

It will be apparent to those in the art that the embodiment shown in FIG. 21 can be modified such that, when the ambient air temperature outside the automobile is high and the engine speed is low, the operation of the compressor 12 is switched over between the full or maximum displacement capacity operation and the small or reduced displacement capacity operation.

Figure 23:
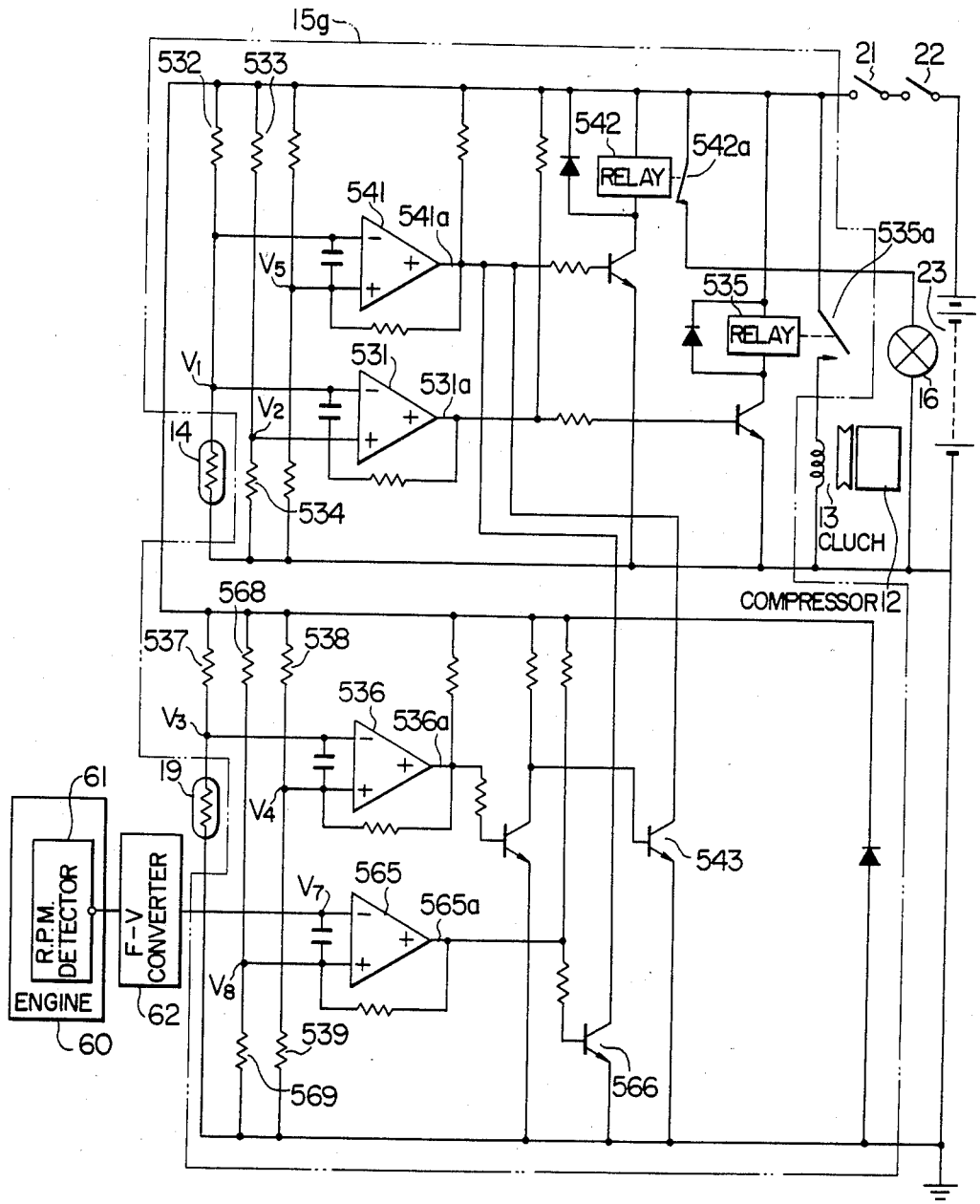
FIG. 23 shows a modified controlling electric circuitry for use in the controlling system shown in FIG. 20.

FIG. 23 shows a still further modified embodiment of the invention. The modification comprises a controlling circuit 15g which has similarlity in many points to the controlling circuit 15a shown in FIG. 11. The parts or elements of the circuit 15g similar to those of the circuit 15a are designated by similar reference numerals added by five hundred (500). The circuit 15g is distinguished from the circuit 15a in the following points:

The controlling circuit 15g includes a comparator 565 having a munus terminal to which is applied a voltage signal V7 from an F-V converter 62 which is electrically connected to a detector 61 for detecting the speed of an engine 60. The F-V converter 62 and the engine speed detector 61 may be identical to the F-V converter 62 and the engine speed detector 61 shown in FIGS. 20 and 21. The comparator 565 is operative to produce an output 565a which is determined by the voltage signal V7 and a reference potential V8 which in turn is dependent on the resistances of resisters 568 and 569. The comparator output 565a is utilized to switch on and off a transistor 566. Unlike the embodiment described with reference to FIG. 11, the temperature detector 19 is disposed to detect the ambient air temperature outside the automobile, as in the embodiments described with reference to FIGS. 19–22.

Figure 24A:
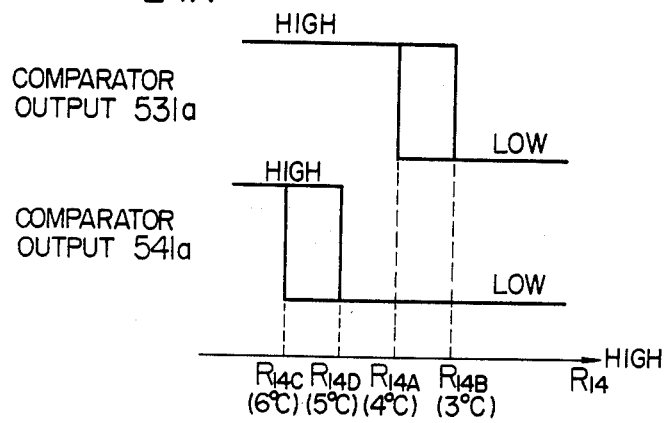
FIGS. 24A to 24C illustrate the operation characteristics of the comparators shown in FIG. 23.
Figure 24B:
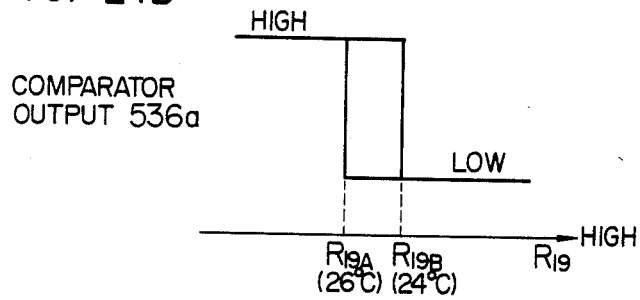

The controlling circuit 15g further includes comparators 541, 531 and 536 provided for the purpose and operation the same as those of the comparators 41, 31 and 36 of the controlling circuit 15a shown in FIG. 11. The operation characteristics of the comparators 541, 531 and 536 are illustrated in FIGS. 24A and 24B.

Figure 24C:
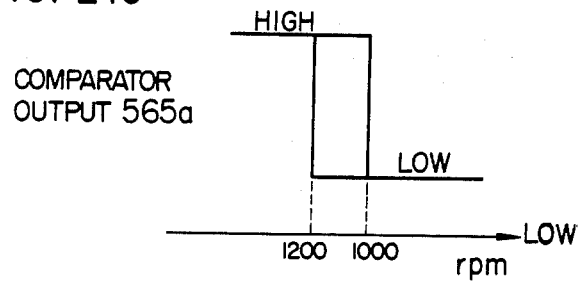

The purpose and operation of the compressor 565 are the same as those of the comparator 65 of the controlling circuit 15f shown in FIG. 21. The operation characteristic of the comparator 565 is illustrated in FIG. 24C.

The embodiment shown in FIG. 23 will be operative as follows:

When the ambient air temperature outside the automobile is higher than 26° C. and the resistance R19 of the thermistor of the temperature detector 19 is less than R19A, the output 536a of the comparator 536 is at "HIGH" level, so that the transistor 543 is in "OFF" state. At this time, if the engine speed is lower than 1000 rpm, the output 565a of the comparator 565 is at "LOW" level, so that the transistor 566 is in "OFF" state.

In this case, the comparators 531 and 541 operate as in the embodiment described in conjunction with FIG. 21. Namely, if the air temperature just downstream of the evaporator 5 is higher than 6° C., the compressor 12 is operatred at its maximum displacement capacity and, when the air temperature just downstream of the evaporator 5 is lowered to a temperature lower than 5° C. and higher than 3° C., the displacement capacity of the compressor is adjusted to the small or reduced displacement capacity substantially equal to from 30 to 50% of the maximum capacity.

If the air temperature just downstream of the evaporator 5 is lowered to a temperature below 3° C., the comparator 531 functions to stop the operation of the compressor 12. On the other hand, if the air temperature just downstream of the evaporator 12 is increased, the displacmene of the comressor 12 is increase to the maximum capacity. As such, the compressor operation is controlled as follows:

Maximum capacity operation⇌Small capacity⇌Stop

When the engine speed is higher than 1200 rpm, the comparator output 565a is at "HIGH" level, so that the transistor 566 is in "ON" state. Thus, the output 541a of the comparator 541 is grounded with a result that the normally closed relay contact 542a is closed to electrically energize the solenoid operated valve 16 to thereby adjust the compressor 12 to be operative at its small or reduced displacement capacity. In this case, if the air temperature just downstream of the evaporator 5 is higher than 4° C., the comparator output 531a is "HIGH" level to engage the clutch 13 so that the compressor 12 is operated at its reduced displacement capacity. On the other hand, if the air temperature just downstream of the evaporator 5 is lower than 3° C., the comparator output 531a is at "LOW" level so that the clutch 13 is disengaged to stop the compressor operation.

When the ambient air temperature outside the automobile is lowered to a level lower than 24° C. and the thermistor resistance R19 is increased to a level higher than R19B, the comparator output 536a becomes "LOW" level to switch the transistor 543 on to ground the comparator outuput 541a so that the compressor 12 is adjusted to be operative at its reduced displacement capacity. At this time, the comparator output 565a has nothing to do with the control of the displacement capacity of the compressor 12. Namely, the compressor 12 is adjusted to be operative at its reduced displacement capacity irrespective of the engine operation speed. The comparator 12 is intermittently or discontinuously operated in accordance with the levels of the output 531a of the comparators 531 which is responsive to the singal V1 from the temperature detector 14 for the air temperature just downstream of the evaporator 5.

As described, when the ambient air temperature outside the automobile is higher than 26° C. and the engine speed is lower than 1000 rpm, the compressor operation is controlled on the basis of the air temperature just downstream of the evaporator and is varied among the maximum displacement opertion, the small or reduced displacement operation and the stoppage of the operation. In addition, in the case where either the ambient air temperature is lower than 24° C. or the engine speed is higher than 1200 rpm, the compressor operation is controlled on the basis of the air temperature just downstream of the evaporator and is varied between the small or reduced displacement operaton and the stoppage thereof.

In the described embodiment of the invention, the air temperature just downstream of the evaporator is detected for the displacement control of the compressor. However, the temperature detector or sensor may alternatively be disposed to detect the temperature of the refrigerant in the evaporator, the temperature of the evaporator fins or the temperature of the refrigerant conduits. The temperature sensor may be replaced by a pressure sensor for detecting the refrigerant pressure within the evaporator.

The resistors 37, 132, 238, 338, 437 and 537 may be replaced by a variable resistor (not shown) which is so disposed as to be easily adjustable by an operator so that the compressor displacement control can be utilized not only to prevent the frosting of the evaporator 5 but also to control the temperature in the occupant compartment of an associated automobile.

The temperature detector 19 has been described as being used to detect the air temperature within the occupant compartment or the temperature of the ambient air outside the automobile. However, this air temperature detector may alternatively be disposed at the air inlet port (i.e., the left end) of the air duct 11 shown in FIGS. 4 and 20 to detect the temperature of air compartment.

The compressor 12 used in the described embodiments of the invention is not limited to the vane type illustrated and described in the application and may alternatively be of another type such as swash plate type.

What is claimed is:

1. A method of controlling a refrigeration system for an automotive air conditioner, said system including a variable displacement refrigerant compressor and an evaporator, said method including:

detecting a condition related to the cooling operation of said evaporator to obtain a first signal;

detecting the ambient temperature outside an occupant compartment of the automobile to obtain a second signal;

when said second signal is at a level greater than a predetermined level, adjusting said compressor to be operative at a large displacement capacity and operating said compressor intermittently in accordance with said first signal; and when said second signal is decreased to a level less than said predetermined level, adjusting said compressor to be operative at a small displacement capacity and operating said compressor intermittently in accordance with said first signal.

2. A method of controlling a refrigeration system for an automotive air conditioner, said system including a variable displacement refrigerant compressor and an evaporator, said method including:

detecting a condition related to the cooling operation of said evaporator to obtain a first signal;

detecting the ambient temperature outside an occupant compartment of the automobile to obtain a second signal;

when said second signal is at a level greater than said predetermined level, causing said compressor to one of be operative at a large displacement capacity, be operative at a small displacement capacity and be inoperative in accordance with said first signal; and when said second signal is decreased to a level less than said predetermined level, causing said compressor to one of be operative at a small displacement capacity and be inoperative in accordance with said first signal.

3. A method of controlling a refrigeration system for an automotive air conditioner, said system including a variable displacement refrigerant compressor adapted to be driven by an engine of the automobile and an evaporator, said method including:

detecting a condition related to the cooling operation of said evaporator to obtain a first signal;

detecting a temperature of an ambient air outside an occupant compartment of the automobile to obtain a second signal;

detecting the operation speed of said engine to obtain a third signal; and utilizing said first, second and third signals to control the compressor operation such that the displacement capacity of said compressor is varied stepwise and said compressor is operated intermettently.

4. A refrigeration system controlling method according to claim 3, wherein, when said second signal is at a level greater than a predetermined level and said third signal is less than a predetermined level, said compressor is adjusted to be operative at a large displacement capacity and said first signal is utilized to control the compressor operation such that said large displacement capacity operation and the stoppage thereof are switched over; and when at least one of aid second and third signals is at a level other than said predetermined level, said compressor is adjusted to be operative at a small displacement capacity and said first signal is utilized to control the compressor operation such that said small displacement capacity operation and the stoppage thereof are switched over.

5. A refrigeration system controlling method according to claim 3, wherein, when said second signal is greater than a predetermined level and said third signal is less than a predetermined level, said first signal is utilized to control the compressor operation such that large and small displacement capacity operations and the stoppages thereof are switched over one from another; and when at least one of said second and third signals is at a level other than said predetermined level, said first signal is utilized to control the compressor operation such that the small displacement capacity operation and the stoppage thereof are switched over.

* * * * *